United States Patent
Yamashita et al.

(10) Patent No.: US 8,561,290 B2
(45) Date of Patent: Oct. 22, 2013

(54) WORK LINE MODULE AND WORK FACILITY

(75) Inventors: Tsugumaru Yamashita, Ritto (JP);
Noritaka Fujimura, Ritto (JP);
Kenichiro Hirao, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 386 days.

(21) Appl. No.: 12/920,261

(22) PCT Filed: Sep. 15, 2009

(86) PCT No.: PCT/JP2009/066064
§ 371 (c)(1),
(2), (4) Date: Sep. 24, 2010

(87) PCT Pub. No.: WO2010/035655
PCT Pub. Date: Apr. 1, 2010

(65) Prior Publication Data
US 2011/0000082 A1    Jan. 6, 2011

(30) Foreign Application Priority Data

Sep. 24, 2008    (JP) ................................. 2008-243620

(51) Int. Cl.
*B65G 43/08* (2006.01)
*B65G 1/06* (2006.01)

(52) U.S. Cl.
USPC ..... 29/783; 414/222; 414/226.03; 198/346.2; 29/563; 29/564; 29/564.1; 29/711

(58) Field of Classification Search
USPC ........ 29/563, 564, 564.1, 711, 783, 791, 823; 414/222, 226.03; 198/346.2
See application file for complete search history.

(56) References Cited

U.S. PATENT DOCUMENTS

| 4,781,512 A | * | 11/1988 | Ohta et al. ............... 414/226.03 |
| 5,025,592 A | * | 6/1991 | Yamamori et al. ................ 451/5 |
| RE35,481 E | * | 3/1997 | Wioskowski et al. ........... 29/563 |
| 6,519,861 B1 | * | 2/2003 | Brueck et al. ................... 33/507 |
| 7,168,548 B2 | * | 1/2007 | Naumann et al. .......... 198/346.2 |
| 2007/0140823 A1 | * | 6/2007 | Dorner et al. ................. 414/685 |

FOREIGN PATENT DOCUMENTS

| JP | 56-102455 A | 8/1981 |
| JP | 1-16620 B2 | 3/1989 |
| JP | 3-10748 A | 1/1991 |
| JP | 2000-94277 A | 4/2000 |

(Continued)

OTHER PUBLICATIONS

Extended European Search Report dated Feb. 10, 2012.

*Primary Examiner* — Peter DungBa Vo
*Assistant Examiner* — Anthony Green
(74) *Attorney, Agent, or Firm* — Birch, Stewart, Kolasch & Birch, LLP

(57) ABSTRACT

Work line module comprises a plurality of machines (103-106) having a plurality of working functions and non-work facility (107, 108) such as a conveying machine can cooperate so as to produce a necessary amount even if the necessary amount is varied. A plurality of work machines (103-106) for mechanically working a workpiece (124) and non-work facility (107, 108) for processing the workpiece (124). One work machine (106) is a multifunction furnishing machine having a function of measuring the workpiece (124) in addition to a function of mechanically working the workpiece (124). A conveying machine (109) having robots (185-187) for conveying the workpiece (124) between the work machines (103-106), and between the work machines (103-106) and the non-work facility (107, 108).

7 Claims, 25 Drawing Sheets

(56) References Cited

FOREIGN PATENT DOCUMENTS

| | | |
|---|---|---|
| JP | 2006-334700 A | 12/2006 |
| JP | 2008-149407 A | 7/2008 |
| JP | 2009-172722 A | 8/2009 |
| WO | WO 2006/032306 A1 | 3/2006 |

* cited by examiner

WORK LINE MODULE AND WORK FACILITY

FILED OF THE INVENTION

The present invention relate to a work line module for machining workpieces at work machines aligned in series and its work facility.

BACKGROUND OF THE INVENTION

In general, a work line module is a combination of a plurality of work machines for machining workpieces, each work machine having a specified machining purpose and non-work facilities for operating operation other than machining the workpieces, for example, washing, drying and assembling (Patent document No. 1). In order to increase a manufacturing capacity of the work line module, a number of the machines including work machines and non-work facilities have to be increased. Thus, an investment for increasing manufacturing capacity has to be remarkably increased. It is necessary to increase a number of the all machines and facilities. However, if an actual production amount is less than an estimated amount, it is considered that machines and facilities newly invested are redundant and an investment newly added is excessive.

Recently, in the all industry field, it is required to provide a manufacturing line of which a manufacturing capacity is always suitable for an amount currently demanded and a number of machines/facilities can be varied depending on industrial demand. However, in a machine manufacturing line, it is difficult to provide such a variable manufacturing line, since a purpose of each machine is simply specified such as machining, furnishing, assembling, cleaning, leak detecting, measuring and drilling. It had not been developed a composite machine/facility for improving manufacturing efficiency and a compact conveying device for arranging a plurality of composite machines/facilities in a line.

PRIOR ART DOCUMENT

Patent Document

Patent Document 1: Japanese Patent Examined Publication 1.16620

SUMMARY OF THE INVENTION

Subject Solved by the Invention

To resolve the above drawbacks, a purpose of the invention is to provide a manufacturing work machine having a plurality of machining functions with novel conveying means so as to correspond to manufacturing amount varied depending on demand.

Means to Resolve the Subject

To resolve the above subject, a work line module according to the first invention comprises multifunction work machines for mechanically working a workpiece, at least one non-working facility for not mechanically working the workpiece, wherein at least one multifunction work machines is capable of mechanically working the workpiece and measuring the workpiece, and a conveying machine including a robot for conveying the workpiece between the work machines and the non-work facility and the workpiece can be continuously operated in a series of operations with respect to the workpiece in the work line module.

To resolve the above subject, in a work line module according to the second invention, the multifunction work machine has a function of furnishing and a function of measuring in the work line module according to the first invention.

To resolve the above subject, in a work line module according to third invention, is the non-work facility includes at least one of an assembling device for assembling a workpiece and a cleaning device for cleaning the workpiece in the work line module according to the first invention.

To resolve the above subject, in a work line module according to the first invention, the conveying machine comprises a rail provided along the work machines, the non-work facility and a carrier on which the workpiece can be mounted and a robot having seven axes, wherein the robot is arranged at a location between the work machines and a non-work facility and moved along the trail and the workpiece is conveyed along a course between the carrier and the work machines or a non-work facility, a course between the work machines and a course between the work machine and the non-work facility in the work line module according to the first invention.

To resolve the above subject, in a work facility according to the fifth invention, a plurality of work line modules, wherein each work line module is one of the first to fourth inventions.

Effect of the Invention

In accordance with the work line module according to the first invention, the work line module is the minimum unit for working a working piece in a series of operations. Thus, the work line module according to the first invention is possible to operate necessary processes such as machine working, assembling and so on in series with respect to a workpiece. If a requested product amount is increased, it is possible to provide an additional work line module.

In accordance with the work line module according to the second invention, the multifunction work machine has a furnishing function and a measurement function so that a furnishing operation and a measurement operation with respect to a finished product are added into necessary operations in series.

In accordance with the work line module according to the third invention, non-work facility comprises at least one of an assembling machine for assembling parts on the workpiece and a cleaning machine for cleaning the workpiece. Thus, in necessary operations in series, an assembling operation for attaching a part on the workpiece and a cleaning operation for cleaning the workpiece are included.

In accordance with the work line module according to the fourth invention, the conveying machine includes a rail arranged along the work machines and the non-work facility, a carrier on which a workpiece is set and trucked on the rail, a robot having seven axes for conveying the workpiece between the work machines and the non-work facility and the workpiece can be continuously operated in a series of working process with respect to the workpiece in the work line module. It is unnecessary for the carrier and the robot to provide a driving device for moving them. A structure of the work line module can be simplified and a manufacturing cost can be reduced.

In according to the work facility according to the fifth invention, even if a request production amount is increased/decreased, the work facility is smoothly corresponding to such a variation since the work facility may select only necessary work line modules according to the first invention to the fourth invention and combined the selected work line modules.

DETAILED DESCRIPTION OF THE INVENTION

The invention will be described with reference to the following embodiments.

Embodiment 1

Figure 1:
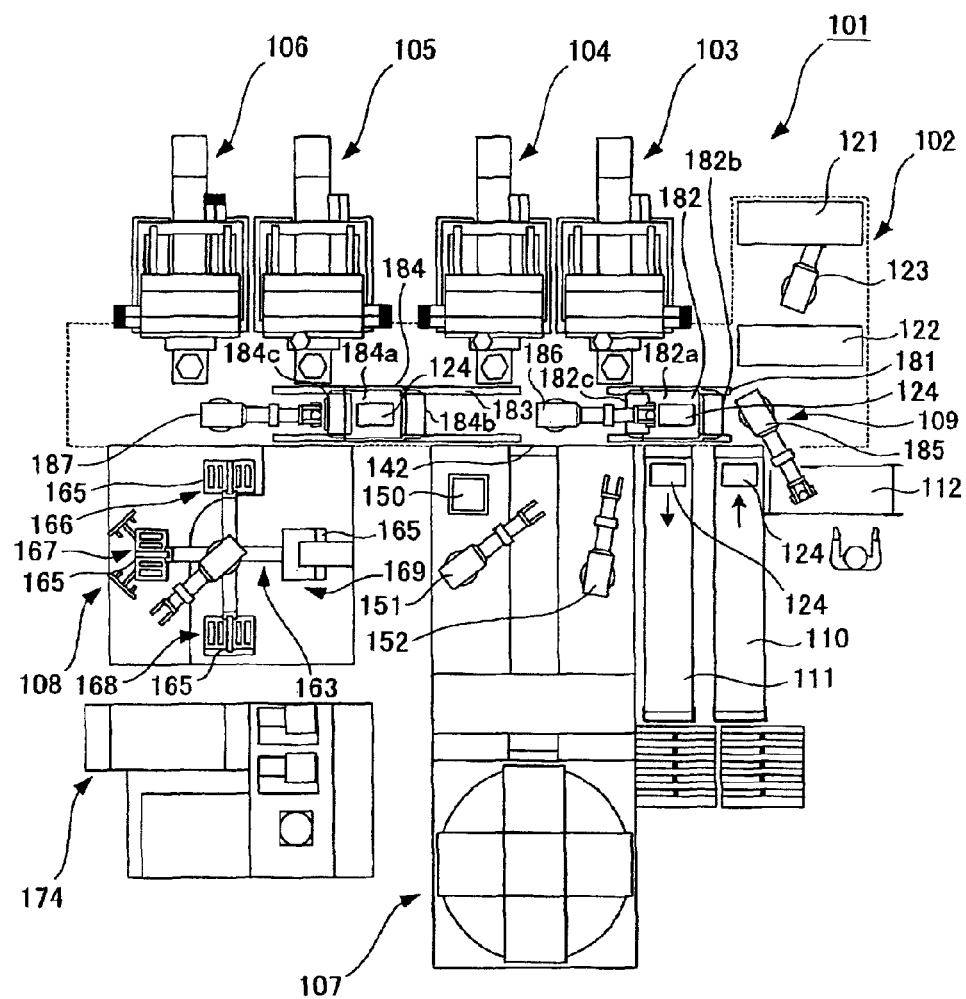
FIG. 1 is a plan view of an outline of a machining line module according to the embodiment 1.
Figure 3:
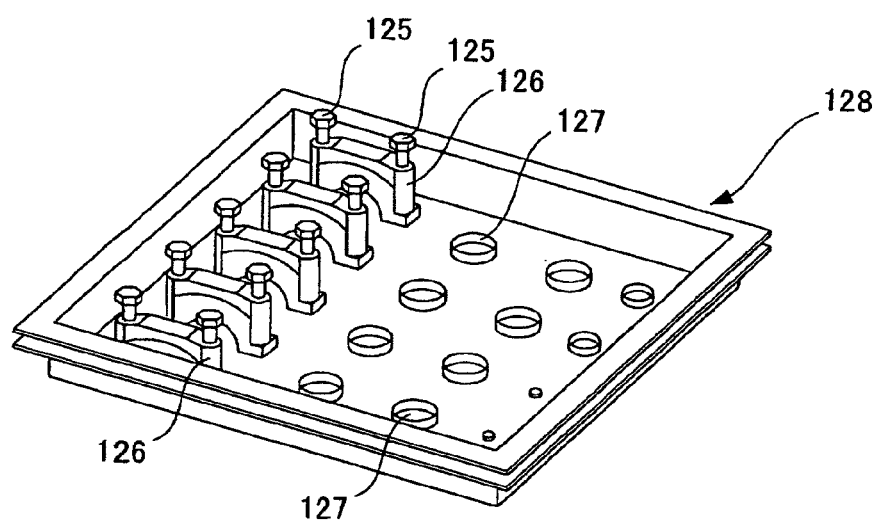
FIG. 3 is a perspective view of a part and a tray.
Figure 4:
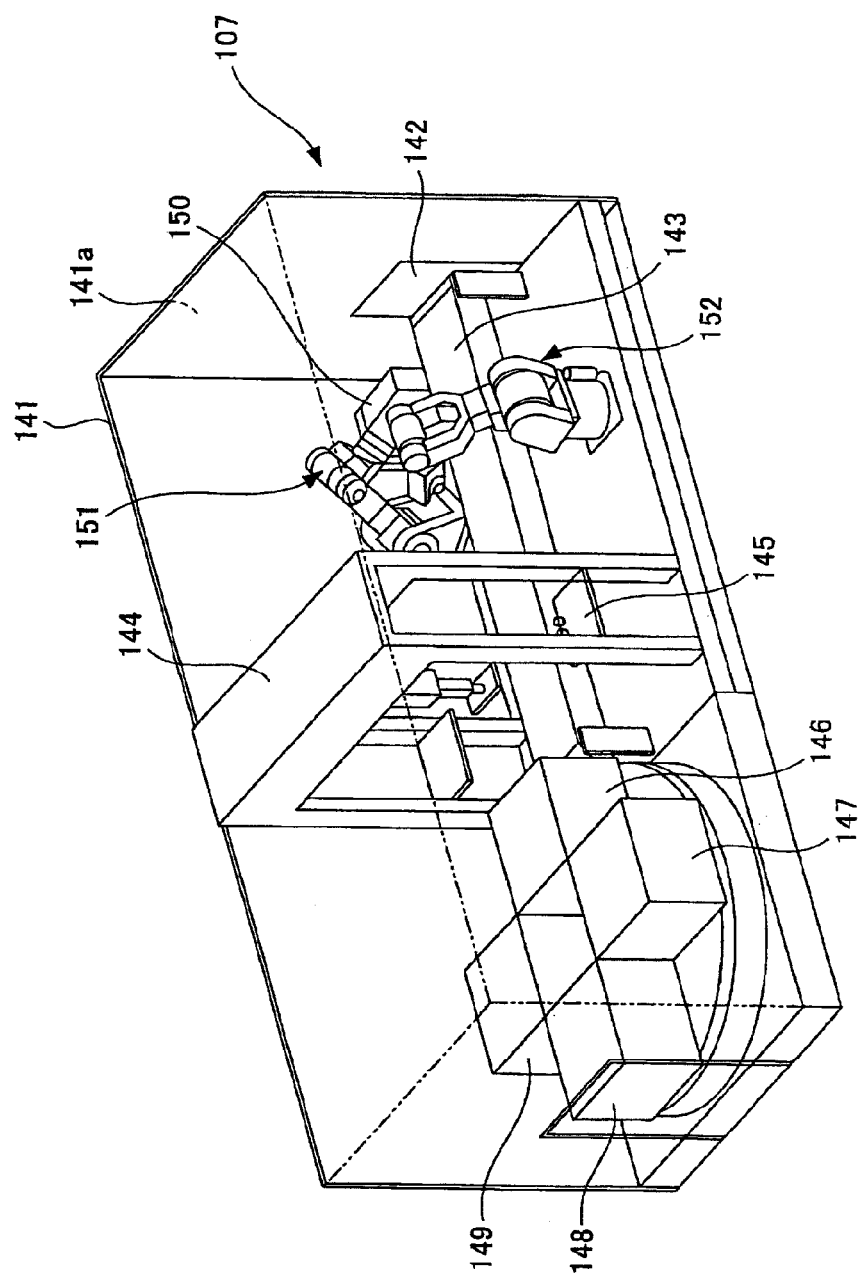
FIG. 4 is a perspective view of an outline of a multifunction assembling device in the work line module in the embodiment 1, wherein a plurality of functions can be operated.
Figure 5:
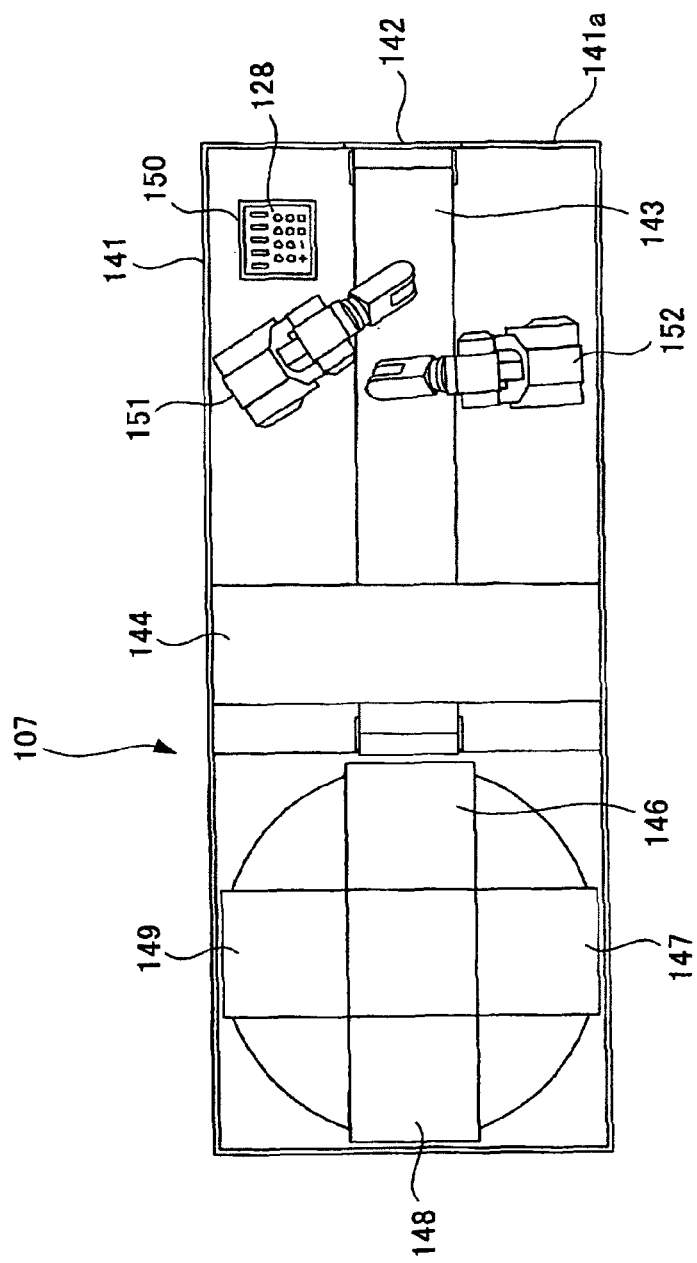
FIG. 5 is a plan view of the assembling device in the work line module according to the embodiment 1.
Figure 6:
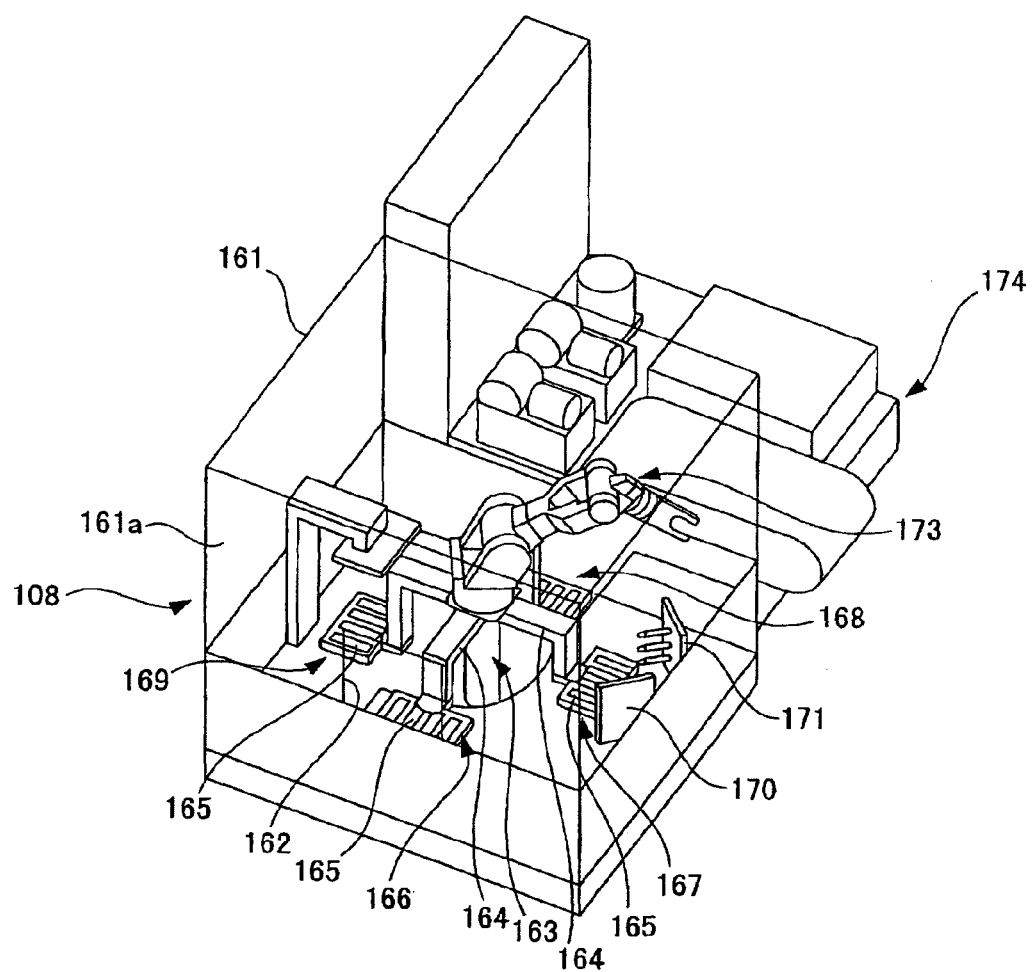
FIG. 6 is a perspective view of an outline of a cleaning device in the work line module according to the embodiment 1.
Figure 7:
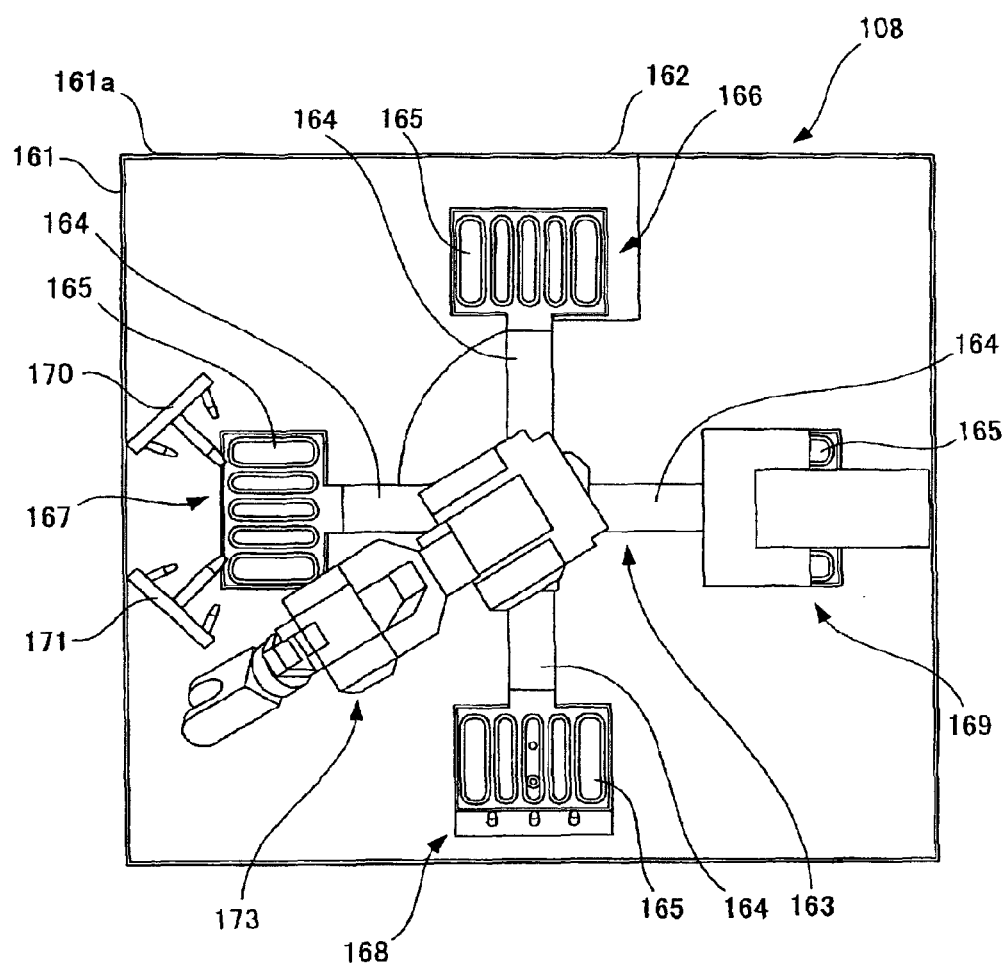
FIG. 7 is a plan view of the outline of the cleaning device in the work line module according to the embodiment 1.
Figure 8:
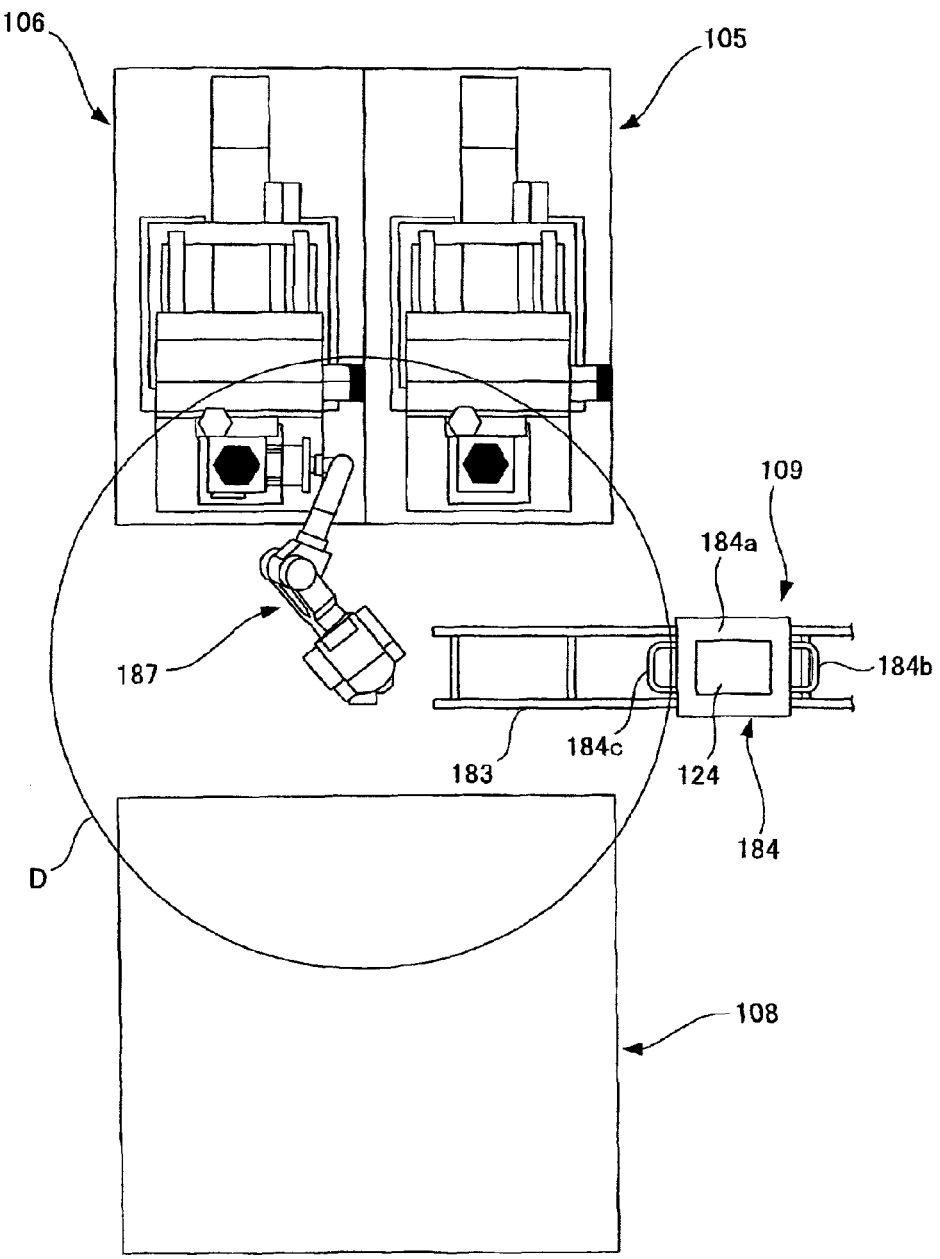
FIG. 8 is a part plan view for showing a part of a conveying device in a machining line module in the work line module according to the embodiment 1.
Figure 9:
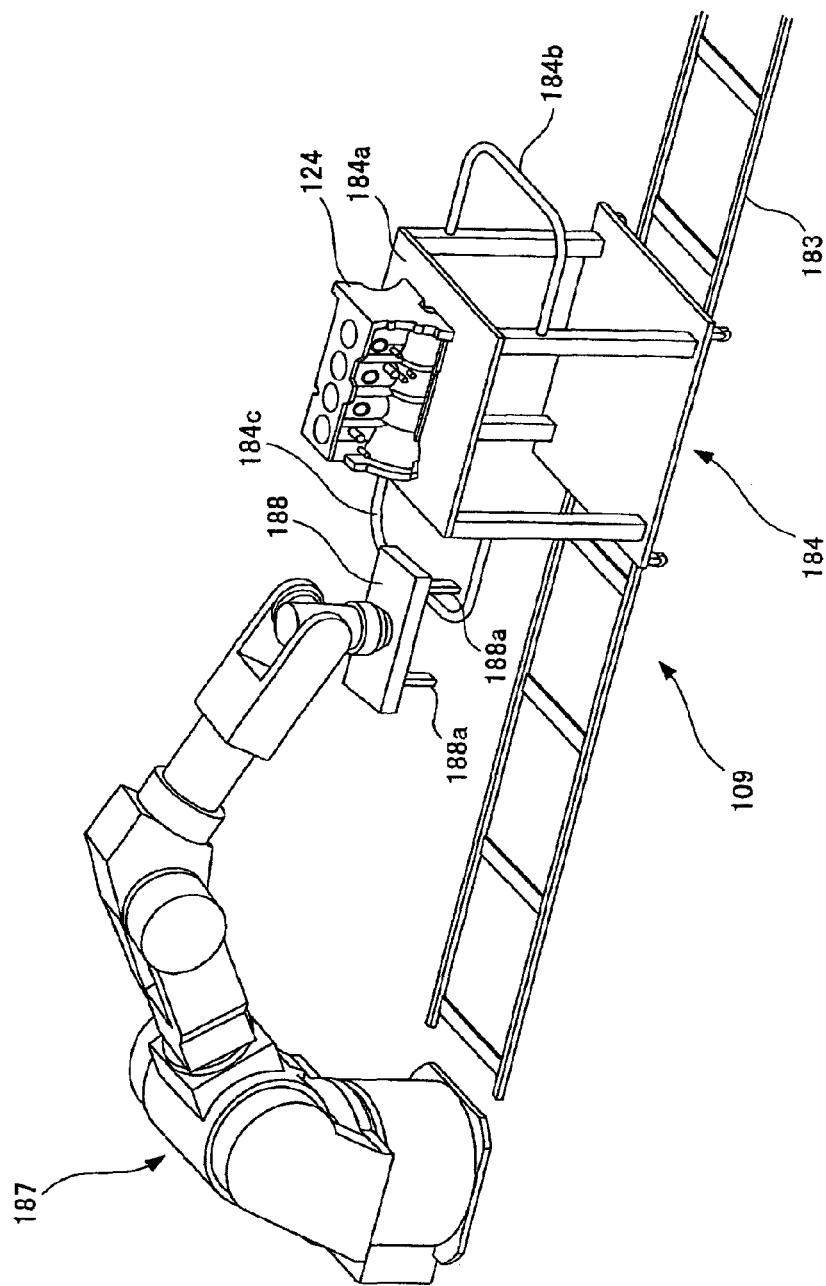
FIG. 9 is a perspective view of a conveying machine in the work line module according to the embodiment 1.
Figure 10:
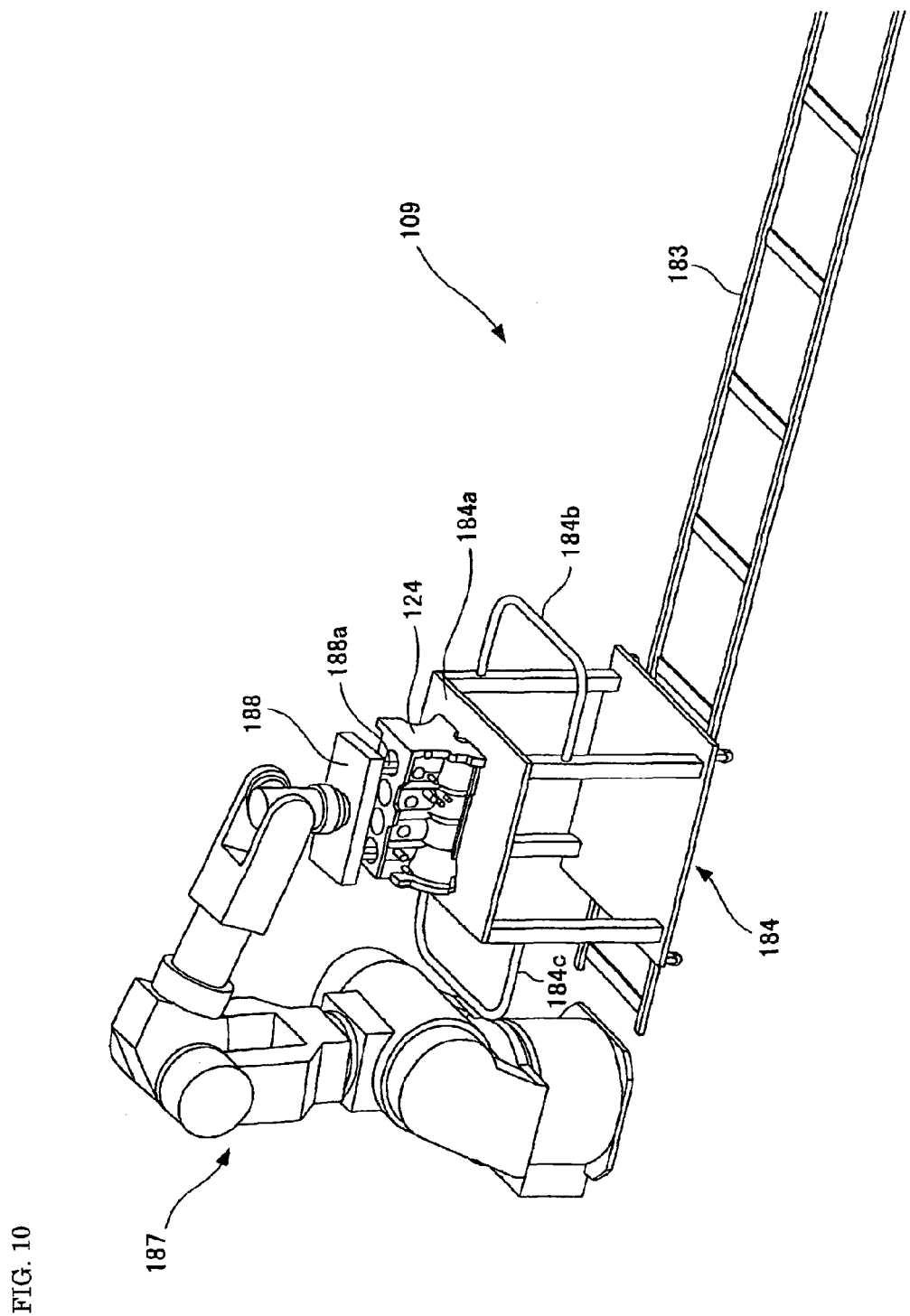
FIG. 10 is a perspective view of a conveying machine in the work line module according to the embodiment 1.

With reference to the accompanying drawings, the embodiment 1 will be described. FIG. 1 is a plan view of an outline of a machining line module according to the embodiment 1. FIGS. 2A to 2H is a perspective view of an example of machined workpiece, respectively. From FIG. 2A to FIG. 2H, working operations with respect to a workpiece are shown in order. FIG. 3 is a perspective view of a part and a tray. FIG. 4 is a perspective view of an outline of a multifunction assembling machine in which a plurality of function can be integrally operated. FIG. 5 is a plan view of the multifunction assembling device. FIG. 6 is a perspective view of an outline of a cleaning device. FIG. 7 is a plan view of the outline of the cleaning device. FIG. 8 is a part plan view for showing a part of a conveying device in a machining line module. FIG. 9 and FIG. 10 is a perspective view of a conveying device, respectively. FIGS. 11 to 22 shows a cross sectional view of each part of a multifunction furnishing machine in which a plurality of functions are integrally operated.

As shown in FIG. 1, a processing line module 101 comprises a part stocking and supplying portion 102 for stocking necessary tools for processing a workpiece and supplying the tools, a first multifunction work machine 103 and a second multifunction work machine 104, wherein the first and second multifunction work machines are located beside the part stocking and supplying portion 102 and have a plurality of functions for machining a workpiece, a third multifunction work machine 105, wherein the third multifunction work machine 105 is juxtaposed to the second multifunction work machine and has a plurality of functions for machining a workpiece, a work machine 106 located so as to make a pair with respect to the third multifunction work machine 105, wherein the work machine 106 has a plurality of functions for furnishing and measuring a workpiece, an assembling machine 107 located at a position opposite to the first and second multifunction work machines with a certain interval, wherein the assembling machine 107 has a plurality of functions, a cleaning machine 108 located at a position opposite to the third multifunction work machine 105 and the furnishing machine 106 with a certain interval and a conveying device 109 for conveying a workpiece to each work machines 103- 106, the assembling machine 107 and the cleaning machine 108. At an opposite side of the assembling machine 107 with respect to the cleaning machine 108, a material lane 110 for introducing a workpiece and a furnished product lane 111 for conveying a product machined and furnished are provided. For example, the lanes 110 and 111 comprise a roller conveyor. At an inlet side of the material lane 110, a working table 112 is provided for an operator who works various machining processes. The conveying device 109 is provided for conveying a workpiece supplied from the material lane 110 to the cleaning device 108 through each the work machines 103-106 and the assembling machine 107. An operation of the conveying device 109 is described hereinafter.

The part stocking and supplying portion 102 consists a part stocking shelf 121, a part supplying shelf 122 having an certain interval with respect to the part stocking shelf 121, a part supplying robot 123 located between the part stocking shelf 121 and the part supplying shelf 122. On the part stocking shelf 121, necessary parts for machining a workpiece in the work line module are stocked. A necessary part is picked up from the part stocking shelf 121 and supplied to a part tray on a part supplying shelf 122 by the part supplying robot 123. The part supplying robot 123 comprises a camera. Therefore, the part supplying robot 123 can recognize a necessary part and carry to the tray independently. FIG. 3 shows a part tray 128 in which a plurality of a bearing cap 126 with bolts 125 and forced insertion plugs 127 are provided. These are corresponding to necessary parts for processing a workpiece (cylinder block) as shown in FIGS. 2A to 2H. The part tray 128 is conveyed to a predetermined location such as the assembling machine 107 by the conveying device 109 as described above.

Figure 2A:
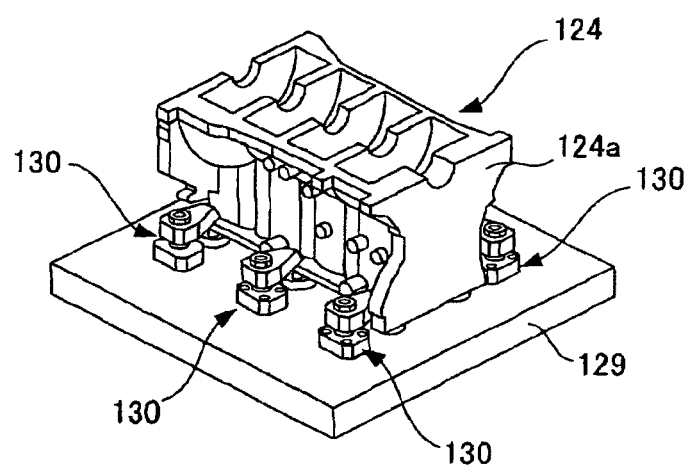
FIG. 2A is a perspective view of a working example of a first multifunction work machine in the work line module according to the embodiment 1.
Figure 2B:
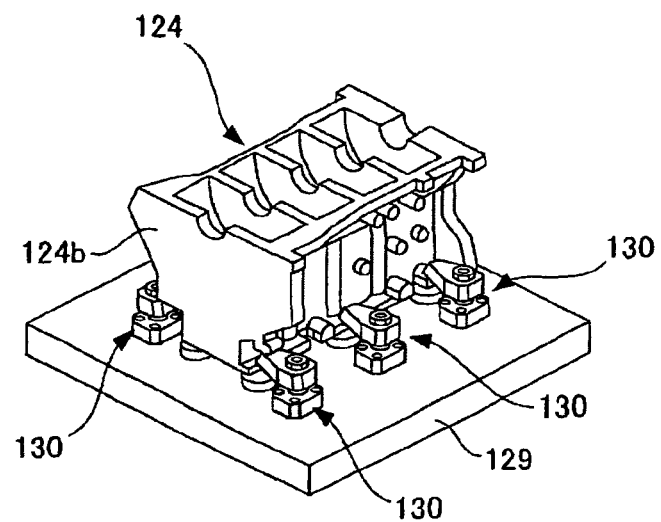
FIG. 2B is a perspective view of a working example of the first multifunction work machine in the work line module according to the embodiment 1.
Figure 2C:
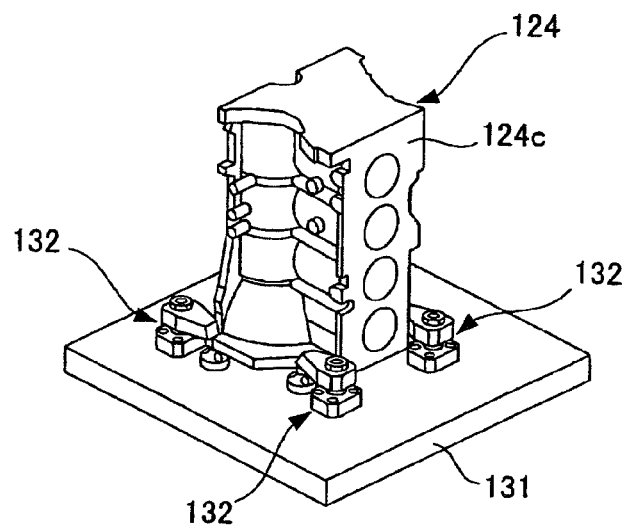
FIG. 2C is a perspective view of a working example of a second multifunction work machine in the work line module according to the embodiment 1.
Figure 2D:
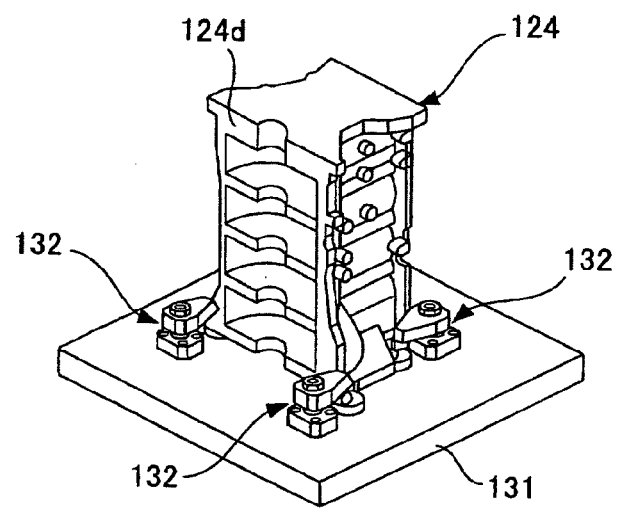
FIG. 2D is a perspective view of a working example of the second multifunction work machine in the work line module according to the embodiment 1.

As shown in FIGS. 2A and 2B, the first multifunction work machine 103 machines the both side surfaces 124a and 124b of the workpiece 124. These surfaces 124a and 24b is a reference surface for setting the workpiece 124 in the later machining processes. The workpiece 124 is inverted and fixed on a workpiece mounting base 129 provided on a table of the first multifunction work machine 103 with a mounting tool 130. The workpiece 214 is rotated in a horizontal plane so that the both side surfaces 124a and 124b can be machined. The second multifunction work machine 104 is similar to the first multifunction work machine 103. However, as shown in FIG. 2C and FIG. 2D, the workpiece is fixed on the work mounting table 131 in a standing style with a mounting tool 132. The workpiece 124 is rotated in a horizontal plane so that two surfaces 124c and 124d, that is, an upper surface and a lower surface of the cylinder block can be machined.

Figure 2E:
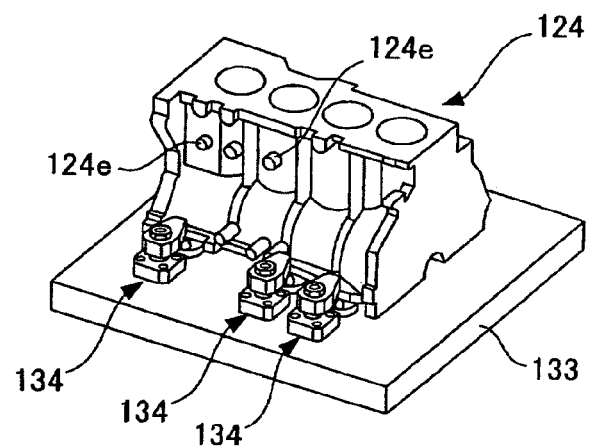
FIG. 2E is a perspective view of a working example of a third multifunction work machine in the work line module according to the embodiment 1.
Figure 2F:
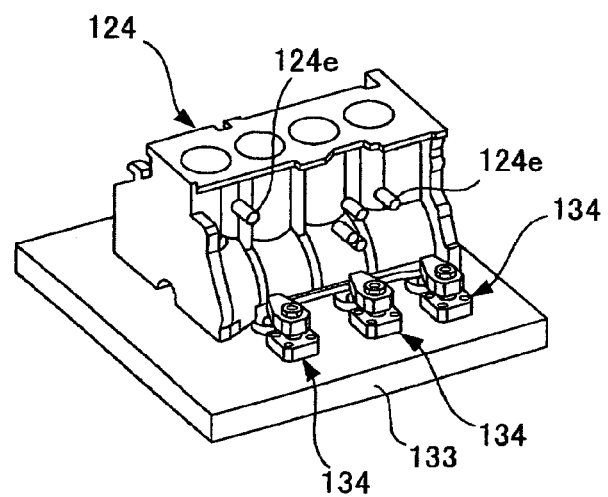
FIG. 2F is a perspective view of a working example of the third multifunction work machine in the work line module according to the embodiment 1.

The third multifunction work machine 175 is also a multifunction work machine. As shown in FIG. 2E and FIG. 2F, a workpiece 124 is fixed on a work mount base 133 by a mounting tool 134 in a style rotated by 180° with respect to the style as shown in FIG. 2A and FIG. 2B. The third multifunction work machine 105 operates a boss process and a thread process so as to attach an auxiliary tool such as an air conditioner on a protruded portion 124e at the both side surfaces of the workpiece 124.

Figure 2G:
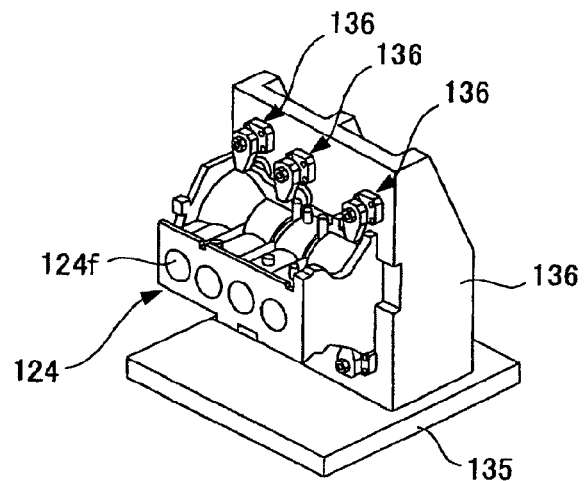
FIG. 2G is a perspective view of a working example of a multifunction furnishing machine in the work line module according to the embodiment 1.
Figure 2H:
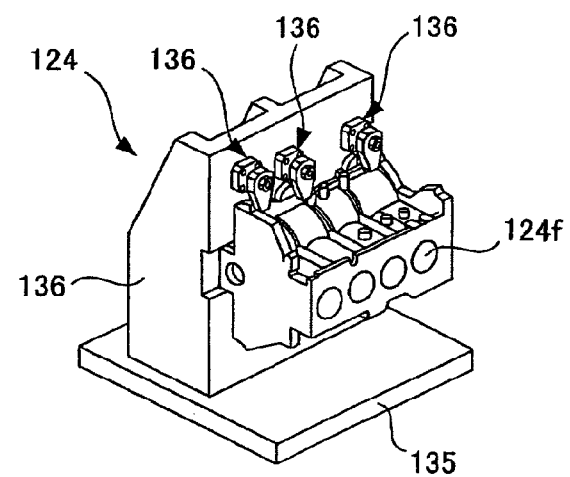
FIG. 2H is a perspective view of a working example of the multifunction furnishing machine in the work line module according to the embodiment 1.

The furnish machine 107 is a multifunction furnish work machine for furnishing and measuring a workpiece as described above. As shown in FIG. 2G and FIG. 2H, a workpiece 124 is fixed on a mounting tool 136 provided on a workpiece mounting table 135 with a mounting tool 137 in a lateral extending style. An upper surface 124c and the both side surfaces 124a and 124b of the workpiece 124 are furnished and a bore 124f of the cylinder block is furnished. Further, an inner diameter of the bore 124f is measured by the furnish machine 106. The multifunction furnish machine 106 is described in detail hereinafter.

The multifunction work machine 107 is formed as a rectangular parallelepiped room 141 and an inside space is divided into a plurality of segments. On a wall 141a of the room 141 adjacent to the work machines 103 and 104, a conveying inlet/outlet opening portion 142 is provided. In side of the room 141, a work setting table 143 is provided in the next of the conveying inlet/outlet opening portion 142. A working head 144 having three shafts is provided confronting with the work setting table 142. Beside the work head 144, there is a working head table 145 on which respective working heads are temporally put. At a side portion of the work setting table 143, various tools for working with respect to the workpiece are provided and positions of the various tools are changeable. As the various tools, a plug press-fitting tool 146, intermediate leaking tool 147, a crank cap tool 148 and a furnish leaking tool 149 are provided. At a near side of the tool setting table 143 with respect to the conveying inlet/outlet opening portion 142, a part tray setting space 150 is provided. At a near side of the work setting table 143 with respect to the part tray setting space 150, a part conveying robot 151 is provided. At an opposite side of the work setting table 143 with respect to the part conveying robot 153, a workpiece conveying robot 152 is provided.

A workpiece 124 is conveyed by the conveying device 109 toward the work setting table 132 through the conveying inlet/outlet opening portion 142. The workpiece conveyed on the work setting table 143 is carried to the working head 144 by the workpiece conveying robot 152 so as to operate various kinds of working. On the other hand, the part tray 128 as shown in FIG. 3 is conveyed from the conveying inlet/outlet opening portion 142 to the work setting table 143 by the conveying device 109. The carried part tray 128 is moved to the part tray setting space 150 by the part conveying robot 151. Various parts in the part tray 128 are supplied to a working portion beyond the working head 144 by the part conveying robot 151 in accordance with a necessary demand.

The cleaning machine 108 is a multifunction cleaning machine capable for intermediate cleaning and furnishing cleaning. The cleaning machine 108 is formed as a room 161 having a plurality of segments. In a wall 161a of the room 161 near from the work machines 105 and 106, a conveying inlet/outlet opening portion 162 is provided. At a central portion of the room 161, a workpiece supporting device 163 with an indexing mechanism. The work supporting device 163 comprises four leg portions 164, each leg portion is angularly separated 90° with respect to the both adjacent leg portions and has a workpiece supporting table 165.

In the room 161, a workpiece conveying inlet/outlet station 166 is provided immediately inside of the conveying inlet/outlet opening portion 162. Further, the first intermediate cleaning station 167, the second intermediate cleaning station 168, the furnishing cleaning station 169 are separately provided with an angular of 90°. In FIG. 6, as a cleaning device, intermediate cleaning nozzles 170 and 171 are provided at the first intermediate cleaning station 167 and a furnishing cleaning nozzle 172 is provided at the furnishing cleaning station 163. A degree-of-freedom of the cleaning robot 173 is relatively high so that the cleaning robot 173 has a capability of removing burr occurred on a workpiece 124 and a capability for cleaning a localized spot. A reason why two intermediate cleaning stations (the first intermediate cleaning station 167 and the second intermediate cleaning station 168) are provided is to select one of the intermediate cleaning stations in accordance with a required demand. Therefore, a purification facility 174 for recovering cleaning liquid and purifying the cleaning liquid is provided outside of the cleaning device 108.

In the next, the conveying device 109 will be described. The conveying device 109 comprises a robot and a carrier. In the case that a movement of a workpiece is only operated by a robot, an operation space of the robot has to become wide, a number of robots have to be increased and/or the robot(s) has to be movable. In any case, a necessary facility for the above robot(s) has to be large and an investment amount for the above robot(s) has to be increased. In the convey machine 109, a robot and a carrier is combined so as to convey a workpiece in a wide area although the necessary facility for the convey machine 109 is compact and an investment thereof is not so increased/

As shown in FIG. 1, a first rail 181 is aligned from a portion beside the material lane 110 and a furnished product lane 111 to the first multifunction work machine 103 and the multifunction assembling machine 107. Along the first rail 181, a first carrier 182 is trucked. The first carrier 182 comprises a workpiece receiving base 182a on which a workpiece is put and towing arm portions 182b and 183c extending from the both side of the workpiece receiving base 182a (the both lateral side of the first carrier 182 along a trailing direction). A second rail 183 is arranged from a portion between the second multifunction work machine 104 and the multifunction assembling machine 107 to a portion between the third multifunction work machine 105 and the cleaning machine 108. Along the second rail 183, a second carrier 184 is trucked. As shown in detail in FIG. 8 to FIG. 10, the second carrier 184 comprises a workpiece receiving base 184a and towing arm portions 184b and 184c extending from the both side of the workpiece receiving base 184a (the both lateral side of the second carrier 184 along a trailing direction). The first carrier and the second carrier have the same structure.

The first conveying robot 185 is arranged at a side of the material lane 110 of the first lane 181. The second conveying robot 186 is arranged between the first rail 181 and the second rail 183. The third conveying robot 187 is arranged at the opposite side of the second rail 183 with respect to the second conveying robot 186. These conveying robots 185, 186 and 187 have no carrier mean, that is, no moving function. These conveying robots can not run over a floor and fixed on a floor. These conveying robots 185, 186 and 187 are multi-joint arm robot having seven or more than joints. At a tip end, a gripper 188 for gripping/releasing a workpiece by opening/closing fingers 188a is provided.

The second conveying robot 186 is arranged at a portion between the first multifunction work machine 103 and the second multifunction work machine 104 and on a line extended from the first rail 181. The second conveying robot 186 does not confront with the first multifunction work machine 103 and the second multifunction work machine 104. Likewise, the third conveying robot 187 does not confront with the third multifunction work machine 105 and the multifunction furnishing machine 106. However, the second conveying robot 105 and the third conveying robot are a multi-joint arm robot having seven or more than joints so that the second conveying robot 186 can access to the first multifunction work machine 103, the second multifunction work machine 104 by a twisting movement of the multi-joint arm and the third conveying robot conveying robot 187 can access to the third multifunction work machine 105 and the multifunction furnishing machine by a twisting movement of the multi-joint arm. FIG. 8 shows the third conveying robot 187 of which the gripper 188 is approaching toward the multifunction furnishing machine 106 by a twisting movement of the multi-joint arm.

The first conveying robot 185 operates that a part tray 128 on the part tray shelf 122 is conveyed to the workpiece receiving base 182a of the first carrier 182, the workpiece 124 is conveyed from an end portion of the material lane 110 to the workpiece receiving base 182a of the first carrier 182 and the workpiece 124 on the workpiece receiving base 182a of the first carrier 182 is conveyed to the furnished product lane 111.

The second conveying robot 186 operates that apart tray 128 on the workpiece receiving base 182a of the first carrier 182 is conveyed from the conveying inlet/outlet opening portion 142 of the multifunction assembling machine 107 to the workpiece setting table 143 in the room 141 and a workpiece 124 is conveyed between the workpiece receiving base 182a of the first carrier 182 and machines such as the first multifunction work machine 103, the second multifunction work machine 104, the multifunction assembling machine 107 and conveyed the workpiece 124 from one of the machines 103, 104 and 107 to the other of the machines 103, 104 and 107. The second conveying robot 186 also operates to convey the workpiece from/to the workpiece receiving base 184a of the second carrier 184.

The third conveying robot 187 operates that a workpiece 124 is conveyed between the workpiece receiving base 184a of the second carrier 184 and machines such as the third multifunction work machine 105, the multifunction furnishing machine 106 and the cleaning machine 108 and the workpiece 124 is also conveyed from one of the third multifunction work machine 105, the multifunction furnishing machine 106 and the cleaning machine 108 to the other of the third multifunction work machine 105, the multifunction furnishing machine 106 and the cleaning machine 108.

FIG. 9 and FIG. 10 show how the second carrier 184 is conveyed by the third conveying robot 187. The second carrier 184 is trucked on the second rail 183 and a workpiece 124 is set on the workpiece receiving base 184a of the second carrier 184. As shown in FIG. 9, the workpiece receiving base 184a of the second carrier 184 is located at an outside of a movable area D of the third conveying robot 187. As shown in FIG. 8, the workpiece receiving base 184a of the second carrier 184 is located at an outside of a movable area D of the second conveying robot 186.

As shown in FIG. 9, the gripper 188 provided at a tip portion of the third conveying robot cannot touch a workpiece on the work receiving base 184c of the second carrier 184 located at an outside of a movable area D of the gripper 188. However, the gripper 188 can touch the towing arm 184c of the second carrier 184. The gripper 188 of the third conveying robot 187 is hooked on the towing arm 184c of the second carrier 184 so that the second carrier 184 can be towed along the second rail 183 in accordance with a movement of the third robot 187. FIG. 10 shows that the second carrier 184 is approached to a position near the third conveying robot 187. In the case that the second carrier 184 is approached to the third conveying robot 187, the gripper 188 of the third conveying robot 187 can grip the workpiece 124.

Figure 11:
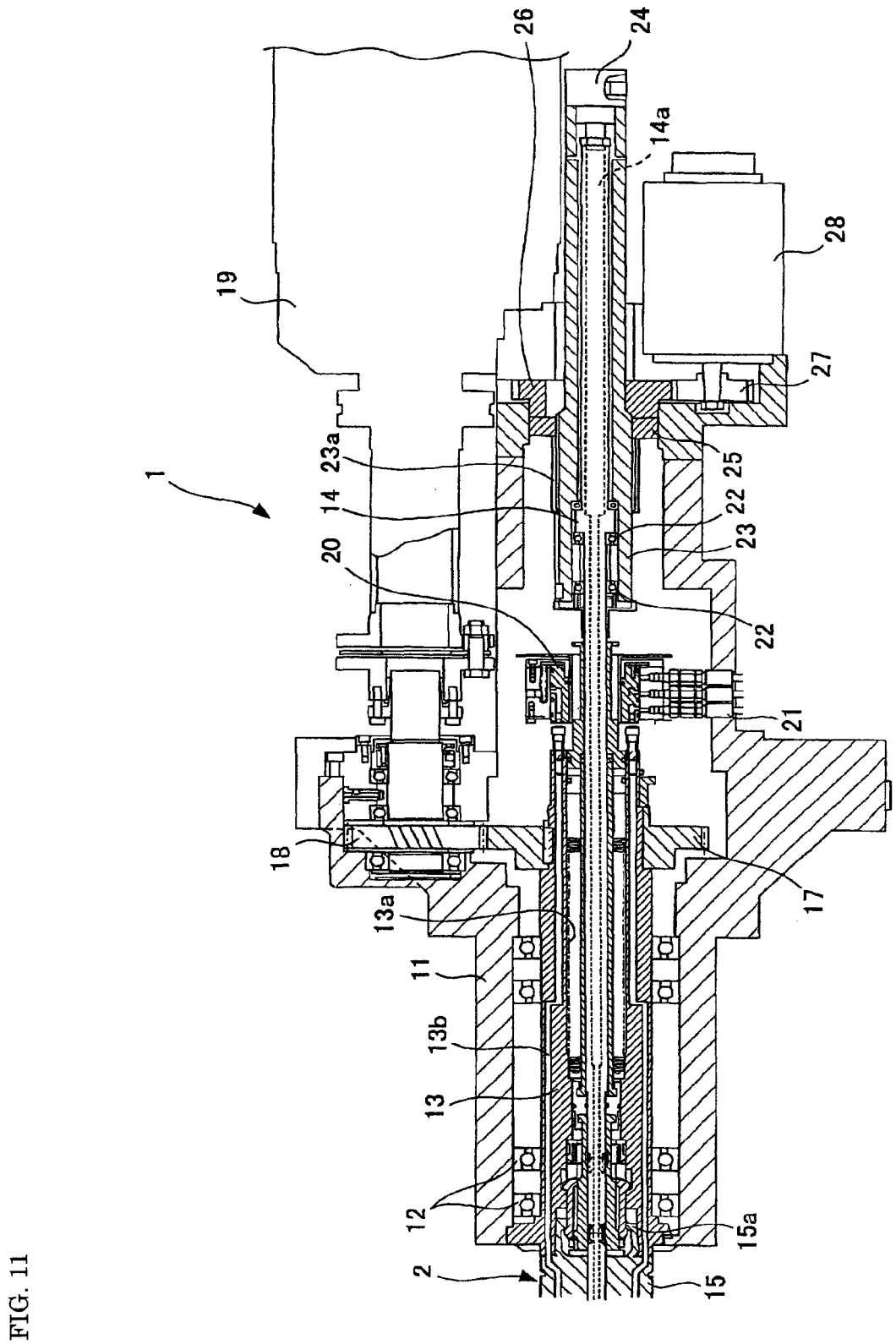
FIG. 11 shows the whole structure of a main shaft device of the multifunction furnishing machine of the work line module according to the embodiment 1 and a part of the structure is shown in a cross sectional view.
Figure 12:
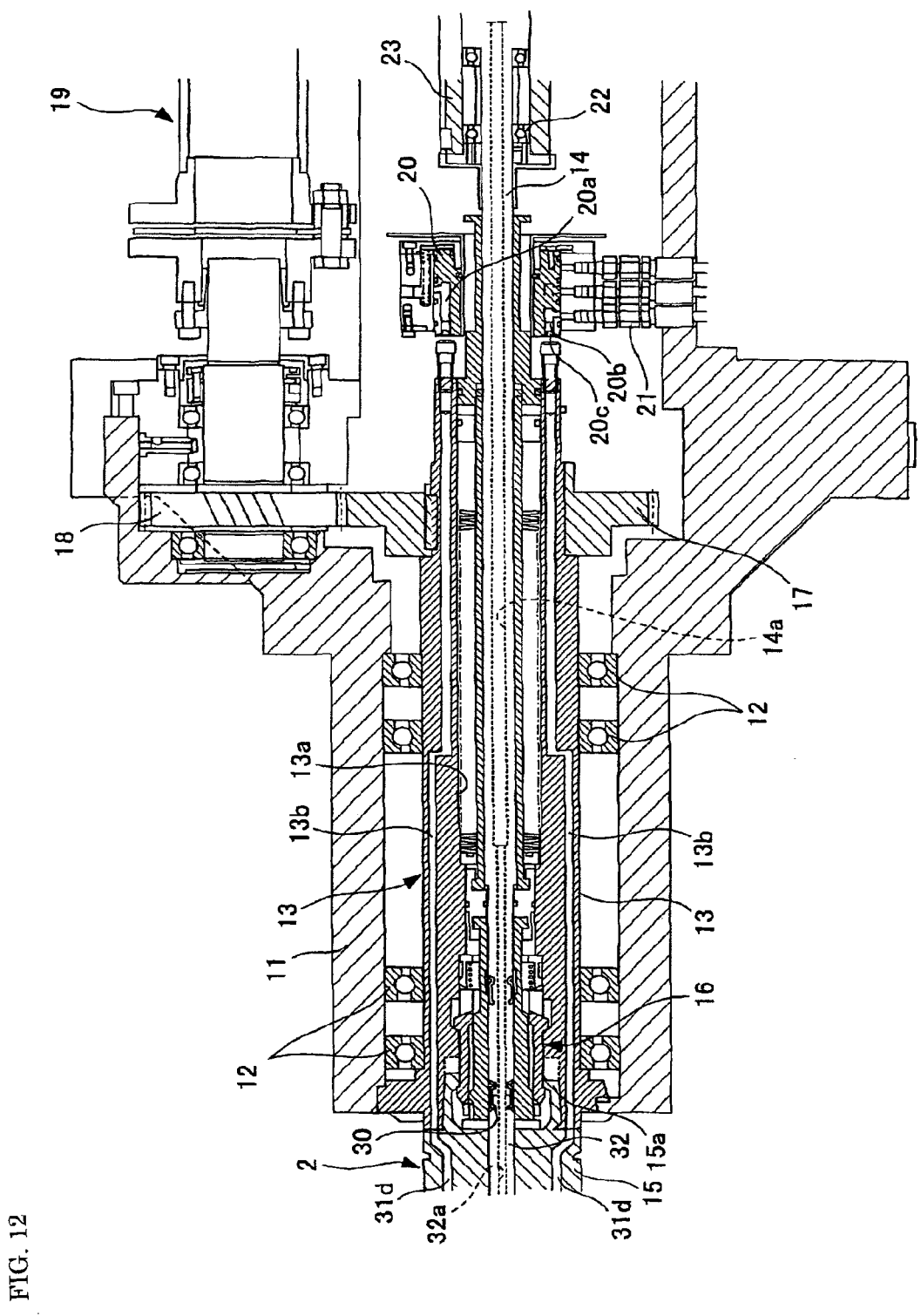
FIG. 12 is a cross sectional view of the main shaft device as shown in FIG. 11.
Figure 13:
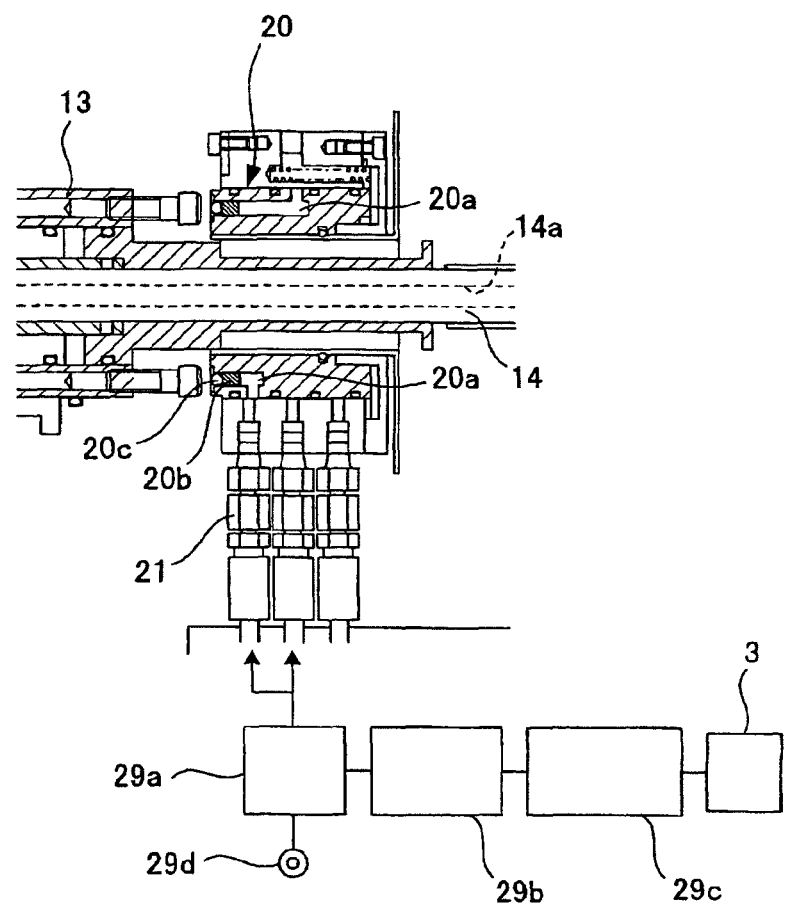
FIG. 13 is an enlarged view of an essential part of the cross sectional view in FIG. 12.
Figure 14:
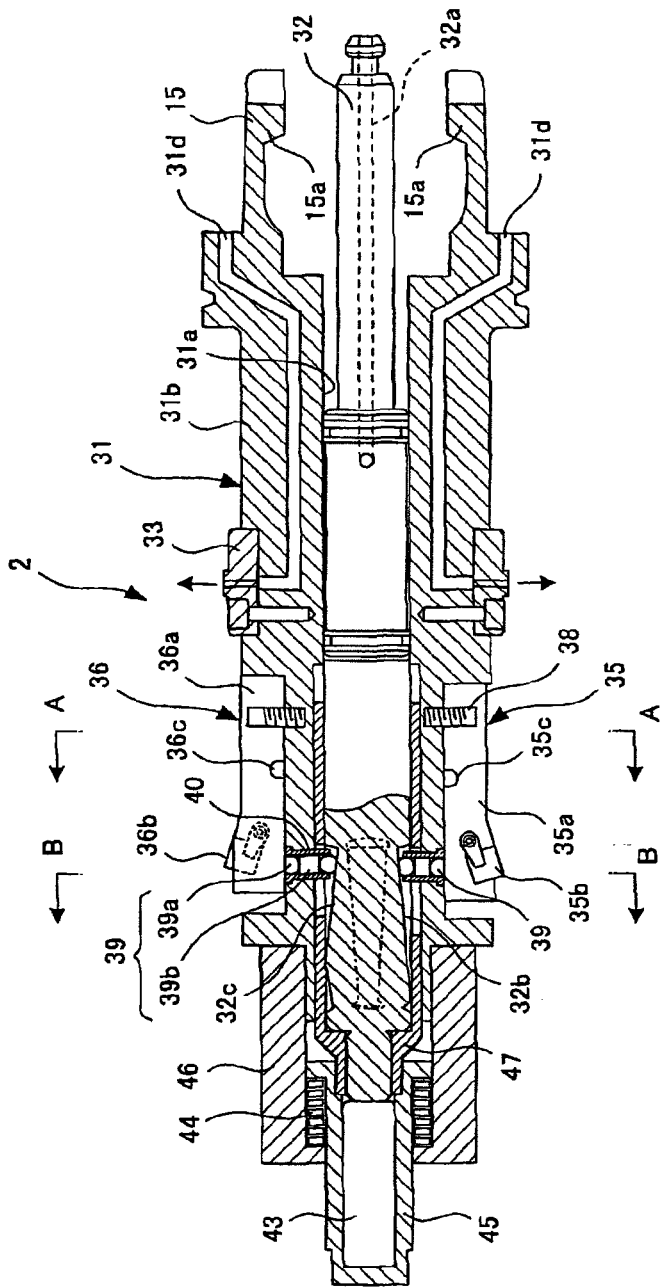
FIG. 14 is a cross sectional view of one example of a tool attached to the main shaft device.
Figure 15:
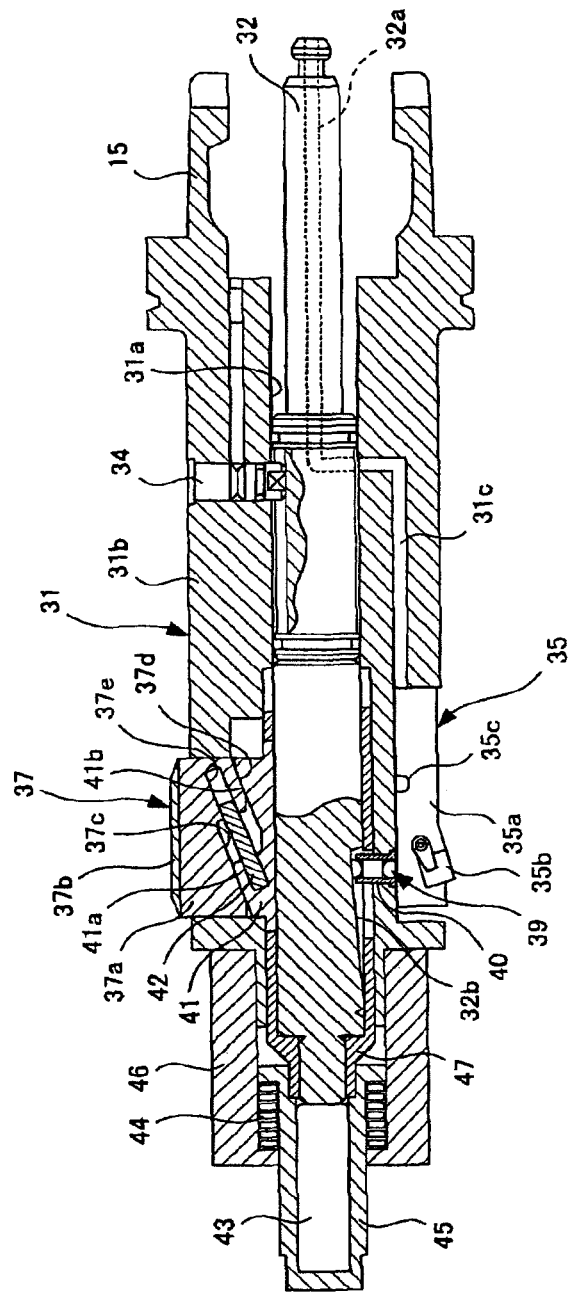
FIG. 15 is another cross sectional view of the tool as shown in FIG. 14.
Figure 16:
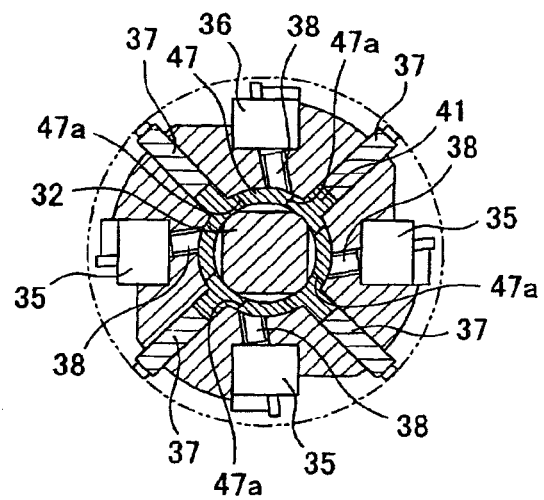
FIG. 16 is a cross sectional view of the tool in FIG. 14 taken along a line A-A.
Figure 17:
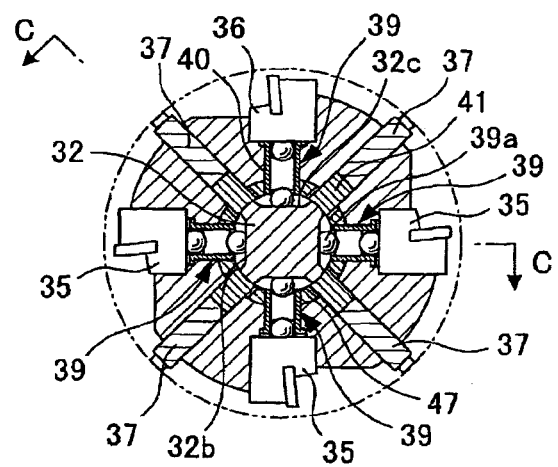
FIG. 17 is a cross sectional view of the tool in FIG. 14 taken along a line B-B.
Figure 18:
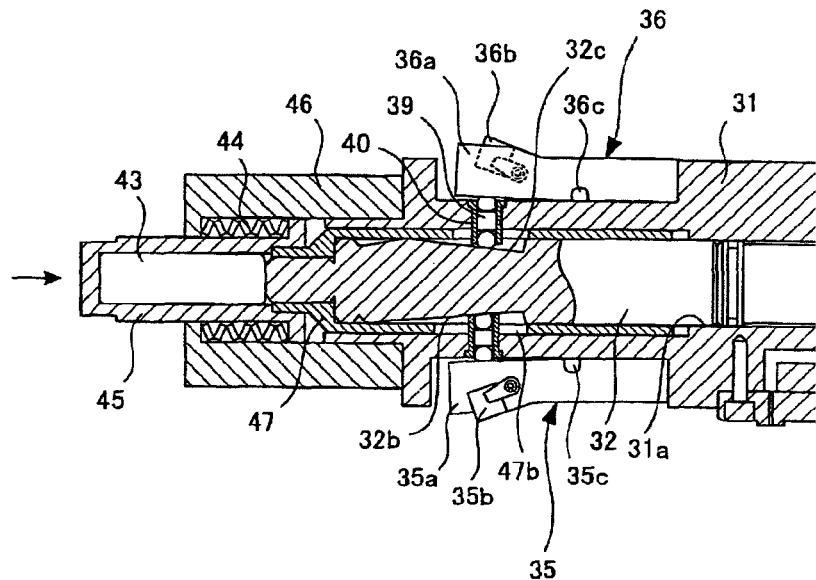
FIG. 18 is a cross sectional view of the tool in FIG. 14, wherein a draw-bar is backwardly moved.
Figure 19:
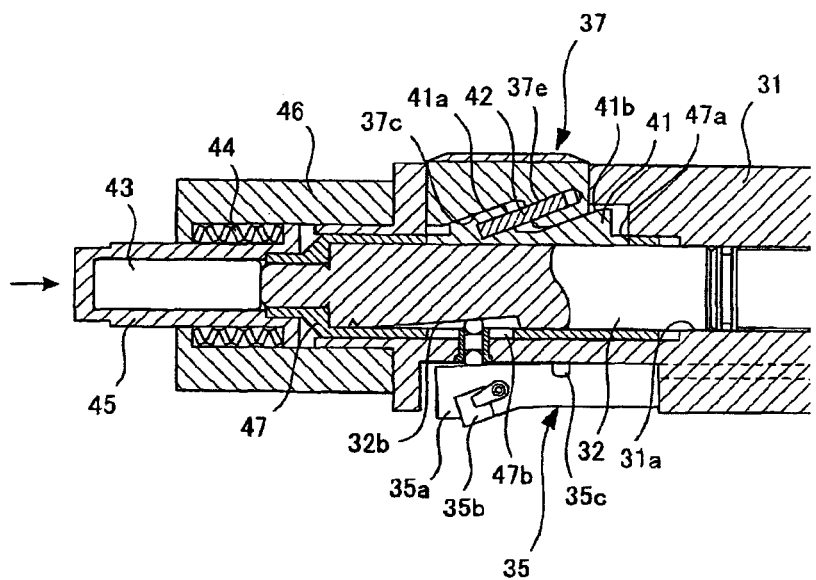
FIG. 19 is another cross sectional view of the tool in FIG. 18.
Figure 20:
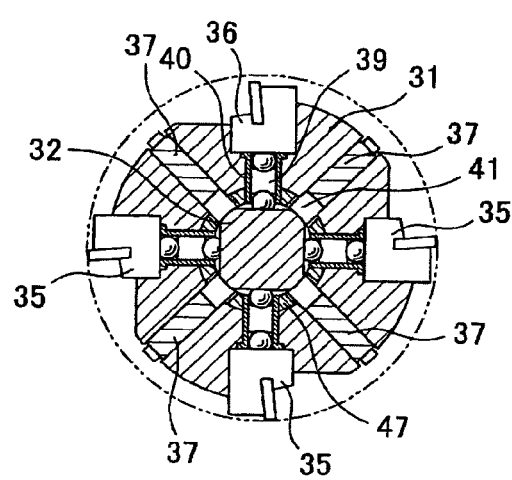
FIG. 20 is a cross sectional view of the tool in FIG. 16 wherein the draw-bar is backwardly moved.
Figure 21:
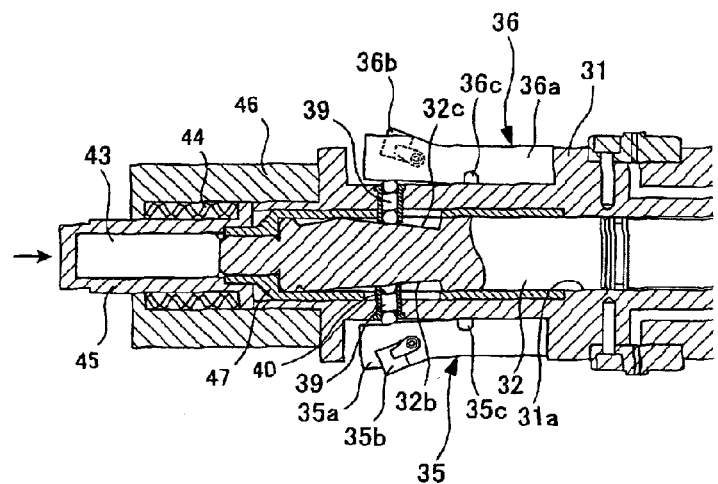
FIG. 21 is a cross sectional view of the tool in FIG. 18 wherein the draw-bar is further backwardly moved.
Figure 22:
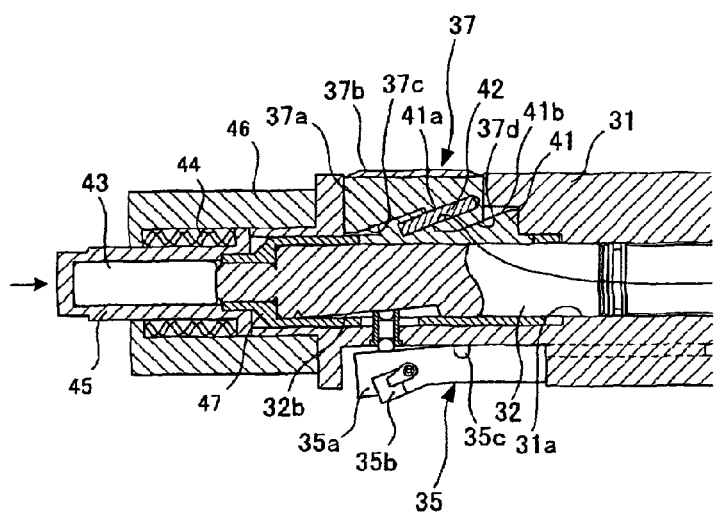
FIG. 22 is another cross sectional view of the tool in FIG. 21.
Figure 23:
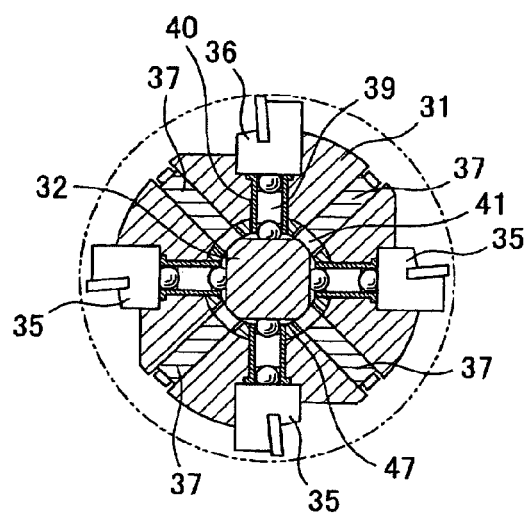
FIG. 23 is a cross sectional view of the tool in FIG. 20 wherein the draw-bar is further backwardly moved.

In the next, a multifunction furnishing machine 106 will be described. The multifunction furnishing machine 106 can furnish an inner surface of a bore of a cylinder as the workpiece 124 and measure the inner surface. FIG. 11 shows a partial cross sectional view of a main shaft device of the multifunction furnish machine 106. FIG. 12 is an enlarged view of an essential part in FIG. 11. FIG. 13 is an enlarged view of an essential part in FIG. 12. FIG. 14 shows a cross sectional view of a tool adapted to the main shaft. FIG. 15 is another cross sectional view of the tool adapted to the main shaft. FIG. 16 is a cross sectional view taken along a line A-A in FIG. 14. FIG. 17 is a cross sectional view taken along a line B-B in FIG. 14. FIG. 18 to FIG. 20 is another cross sectional views of the tools as shown in FIG. 14, FIG. 15 and FIG. 16, respectively. FIG. 21 to FIG. 23 is still another cross sectional views of the tools as shown in FIG. 14, FIG. 15 and FIG. 16, respectively.

As shown in FIG. 11 and FIG. 12, the main shaft device 1 of the multifunction furnishing machine 106 comprises a main shaft 13 rotatably housed and supported by a housing 11 through a bearing 12 and a main shaft side draw-bar 14 as a main shaft driving axis capable of inserting an axial hole 13a formed on an axial line of the main shaft 13 in a forward-backward direction.

The main shaft 13 receives a tool holder 15 and a clamp mechanism 16 by which the main shaft 13 and the tool holder 15 can be integrally rotated at a front end of the main shaft 13. A pair of measurement air supplying paths 13b penetrates in a peripheral wall along an axial direction and the each measurement air supplying path is oppositely arranged with respect to the axial line. The main shaft 13 is rotated by an main shaft driving motor 18 as a first driving means through the main shaft side transmission gear 17 and a main shaft driving motor side transmission gear 18.

An opening portion provided at the front end (adjacent the end of the tool) of the measurement air supplying path 13b is confronting with a measurement air supplying path 31d formed in the tool 2 as described below. An opening portion provided at a back end (opposite to the end of the tool) of the measurement air supplying path 13b is confronting with an air supply connecting unit 20 of an air micrometer for supplying measurement air into the measurement air supplying path 13b.

The air supply connecting unit 20 is hydraulically movable along an axial direction in a front-rear direction. If the air supply connecting unit 20 is shifted toward the tool, a ball 20c of a ball check valve 20b provided at a front end of the measurement air supplying path 20a is contacted with and pressed by the air supply connecting unit 20 so that an measurement air path 20a is released. Thus, measurement air jetted from an air supplying portion 21 can be supplied into the measurement air supplying path 13b. In the case of an embodiment as shown in FIG. 11 to FIG. 13, one measurement air supplying portion 21 supplies measurement air to the measurement air supplying path 13b indicated at a lower half side of the main shaft 13. The other measurement air supplying portion 21 supplies measurement air to the measurement air supplying path 13b indicated at an upper half side of the main shaft 13.

At the front end of the main shaft side draw-bar 14, a smaller diameter portion 15a of a tool holder 15 is received with the clamp mechanism 16 so that the tool holder 15 and the main shaft 13 can be integrally clamped. On the axial line, a coolant supplying path 14a for supplying coolant to the tool 2 is provided. A total joint 24 into which a hose (not shown) for supplying coolant is attached is provided at the rear end. At a rear end of the main axis side draw-bar 14, a draw-bar driving shaft 23 support the tool holder through the bearing 22.

On a peripheral surface of the draw-bar driving shaft 23, a screw portion for engaging with a nut 25 fixed on the housing 11 is provided so that the draw-bar driving shaft 23 is rotated by the draw-bar driving motor 28 via the draw-bar driving shaft transmission gear 26 and the draw-bar driving motor transmission gear 27.

That is, the draw-bar driving shaft 23 is rotated by the draw-bar driving motor 28 and then the screw portion 23a engaging with the nut 25 is shifted in the axial direction. At that time, the draw-bar driving shaft 23 supports the main shaft side draw-bar 14 through the bearing. Therefore, a rotational force of the draw-bar driving shaft 23 is not transmitted to the main shaft draw-bar 14. The movement in the axial direction is only transmitted.

Thus, when the draw-bar driving shaft 23 is rotated by the draw-bar driving motor 28, the main shaft side draw-bar 14 is only shifted in the axial direction while the main shaft side draw-bar 14 is released from a rotating draw-bar driving shaft 23. Accordingly, the main shaft side draw-bar 14 is shifted in the axial direction so that a tool side draw-bar 32 (as described below) detachably connected to the main shaft draw-bar 14 can be moved in the axial direction through a collet 30 that is opened/closed by a forward-backward movement of the main shaft side draw-bar 14.

In the main shaft device as described above, as shown in FIG. 14 to FIG. 17, a tool 2 attached to the main shaft device according to the embodiment is a tool of which a diameter is variable and commonly used for bowling and honing. Mainly, the tool 2 comprises a tool body 31, a tool side draw-bar 32 movably supported by an axial hole 31 in the axial direction of the tool body 31 in a frontward-backward direction and a plurality of sword portions and whetstones attached to the tool body 31 as described below.

The tool body 31 comprises a coolant supplying path 31c for flowing coolant provides on a peripheral surface 31b of the tool body 31 and a pair of measurement air supplying paths 316 into which measurement air is supplied from the air micrometer and the measurement air supplying paths oppositely arranged with respect to the axial line. One end of the coolant supplying path 31c is confronting with an opening surface of the axial hole 31a of the tool body 31 and the coolant supplying path 31d extends in the tool body 31 toward the front end of the tool body 31 and the other end of the coolant supplying path 31c is provided at the front end of the tool body 31. A main shaft side opening portion of the measurement air supplying path 31d is confronting with a measurement air supplying path 13b formed in the main shaft 13. A tool front side opening air of the measurement air supplying path 31d is connected to the measurement air nozzle 33 formed in the peripheral wall 31b of the tool body 31. Further, the tool body 31 comprises a stop spinning mechanism 34 for moving the tool side draw-bar 32 in a forward/backward direction with respect to the tool body 31 and rotating the tool side draw-bar 32 integrated with the tool body 31.

Three intermediate furnishing members 35 and one furnishing member 36 as the first working member and four honing members 37 as the second working member are adapted to the tool body 31 and those can be shifted along a radial direction.

As shown in FIG. 16 and FIG. 17, among the intermediate furnishing members 35, the furnishing member 36 and honing members 37, four members, that is, the three intermediate furnishing members 35 and the furnishing member 36 are radially arranged with a constant angular interval and each honing member 37 is radially arranged with a constant angular interval in the interval between adjacent members of the four members.

In the tool side draw-bar 32, a coolant supplying path 32a for supplying coolant to the coolant supplying path 31c of the tool body 31 as described above is provided along a line extended from the axial line of the tool side draw-bar 14. One opening end at the front side of the tool of the coolant supplying path 31c is connected to an opening portion of the coolant supplying path 14a of the main shaft draw-bar 14. On the other hand, the opposite opening portion at the front end of the tool is confronting with the opening portion of the axial hole 31a of the coolant supplying path 31c of the tool body 31. Thereby, the coolant supplied from the main shaft device 1 is supplying to a working portion.

As shown in FIG. 14, the intermediate furnishing member 35 comprises a pillar-shaped intermediate cutting tools holding member 35a extending along the axial direction and an intermediate cutting tool 35b fixed by the intermediate cutting tool holding member 35a. A rear end (a right side in FIG. 14) of the intermediate furnishing cutting tool holding member 35a is fixed on the tool body 31 with a screw 38 (as shown in FIG. 16). On the other hand, at a front end side of the tool with respect to the screw 38 on a surface confronting with the tool body 31, a notch portion 35 is formed along a direction perpendicular to the axial direction. From the notch portion 35c of the intermediate furnishing cutting tool 35a, the intermediate furnish cutting tool 35b is attached and extending toward an outer radial direction with respect to the front end of the tool.

Likewise, the furnishing member 36 comprises a pillar-shaped furnishing cutting tool holding member 36a extending along the axial direction and a furnish cutting tool 36b fixed on the furnishing cutting tool holding member 36a. A rear end (a right side in FIG. 14) of the furnishing cutting tool holding member 36a is fixed on the tool body 31 with the screw 38. On the other hand, at a front end side of the tool with respect to the screw 38 on a surface confronting with the tool body 31, a notch portion 36c is formed along a direction perpendicular to the axial direction. From the notch portion 36c of the furnishing cutting tool holding member 36, the furnishing cutting tool 36b is attached and extending toward an outer radial direction with respect to the front end of the tool.

On an outer peripheral surface of the tool side draw-bar, an inclined portion confronting with the intermediate furnishing member 35 (hereinafter, it is referred as "intermediate furnishing taper surface 32b") and an inclined portion confronting with the furnishing member 36 (hereinafter, it is referred as "furnishing taper surface 32c") is provided, respectively.

In the embodiment, the intermediate furnishing member taper surface 32b is inclined from the main shaft side to the front end of the tool so as to increase a distance between the taper surface and the axial direction slightly (for example, an inclined angle is 2°). The furnishing member taper surface 32c is inclined from the main shaft side to the front end of the tool in a movable area of the main shaft side draw-bar 14 with respect to the tool body 31 so as to increase a distance between the taper surface and the axial direction slightly (for example, an inclined angle is 3°). At a taper surface from the front end of the tool in the movable to the front end of the tool, a distance between the taper surface and the axial direction is slightly decreased. Upon comparing with the intermediate furnishing member taper surface 32b and the furnishing member taper surface 32c, the inclined degree of the former is larger than that of the later.

In a space between the intermediate furnishing cutting tool holding portion 35a and the intermediate furnishing member taper surface 32a and a space between the furnishing cutting tool holding member 36a and the furnishing member taper surface 32c, a tapered transmission pin 39 penetrates the both spaces in a radial direction as the first transmission means. The transmission pin 39 comprises two hemispheres 39a and an insertion member 39b inserted between two hemispheres 39a, wherein the hemispheres 39a and the insertion member 39b are hold be a cylindrical hold member 40 sixed on the tool body 31 and can be slit along a longitudinal direction of the hold member 40. The hemispheres 39a are arranged so as to contact the spherical surface of the hemispheres 39a with the insertion member 39b. A place surface of the hemispheres 39a contacts one of the intermediate furnishing cutting tool holding member 35a and the intermediate furnishing member taper surface 32b, or one of the furnishing cutting tool holding member 36a and the furnishing member taper surface 32c.

As shown in FIG. 15, the honing member 37 comprises a board shaped whetstone holding member 37a and a whetstone 37b fixed on an outer spherical surface of the whetstone holding member 37a arranged in a radial direction of the honing member 37. The honing member 37 penetrates the tool body 31 in a radial direction and can be slit along the radial direction. The whetstone holding member 37a comprises two inclined surfaces 37a and 37d, wherein the inclined surfaces 37a and 37d are provided on a surface confronting with the tool side draw-bar 32 and extended toward a direction from the main shaft side to the frond end of the tool and sandwiching a stepped portion so as to decrease a distance between the axial line of the tool side draw-bar and the outer peripheral surface with respect to a radial direction slightly. FIG. 15 shows a perspective view taken along a line C-C in FIG. 17.

Further, a whetstone extended plate 41 is provided at a space between the honing member 37 and the tool side draw-bar 32. The whetstone extended plate 41 has a thickness substantially equal to that of the whetstone holding member 37a. A whetstone extending plate 41 and a holding member sandwiches a stepped portion. An outer peripheral surface 41a of the whetstone extending plate 41 and an inner peripheral surface 41b of the honing member 37 are inclined from the main shaft to the front end of the tool so as to decrease a distance between the peripheral surface and the axial center of the tool side draw-bar 32 slightly. Thereby, a shape of the outer peripheral inclined surface 41a of the whetstone extending plate 41 is substantially equal to that of the inner peripheral inclined surface 41b of the honing member 37. The whetstone extending plate 41 is attached on a surface of the tool side draw-bar 32. At a front end of the tool side draw-bar 32, a cylindrical member 47 is covered so that the cylindrical member 47 and the tool side draw-bar 32 are integrally formed. An inner peripheral surface of the whetstone extending member 41 is fitted into a slit 47a provided at the cylindrical member 47. A slit 47b for the transmission pin is also formed on the cylindrical member 47 so that the tapered transmission pin 39 is passed through the slit 47b.

On the whetstone extending plate 41, a whetstone interlocking pin 42 is fixed and protruded from an end portion of the whetstone extending plate 41. In the whetstone holding portion 37a, a hole 37e into which the whetstone interlocking pin 42 protruded from the whetstone extending plate 41 is inserted is provided. The whetstone interlocking plate 41 and the hole portion 37e are extending in parallel with the inclined surfaces 37c and 37d of the honing member 37 and the inclined surfaces 41a and 41b of the whetstone extending plate 41.

As shown in FIG. 14 and FIG. 15, a cylindrical body 46 having a bottom surface is provided at the front end of the tool body 31 so as to cover a front end of the tool side draw-bar 32. A penetrated hole is formed at the bottom surface of the cylindrical body 46. The second cylindrical surface body 45 having a bottom surface in which a hydraulic spring 43 is stored is inserted into the penetrated hole. The hydraulic spring 43 contact with a tip portion of the tool side draw-bar 32 and presses the tool side draw-bar 32 toward the main shaft side. The second cylindrical body 45 is integrally connected to the tip portion of the cylindrical portion 47.

A flange portion is formed an outer peripheral edge of an opening portion of the second cylindrical body 45 positioning at an inside of the first cylindrical body 46. A diaphragm brake 44 is inserted between the flange portion of the second cylindrical body 45 and the bottom surface of the first cylindrical body 46 at an inside of the first cylindrical body 45. The diaphragm brake presses the hydraulic spring 43 toward the tool side draw-bar 32 through the second cylindrical body 45.

In the next, it is described an example of an operation for processing a workpiece 124 in a work line module 101 including the multifunction work machine 106 as described above.
(1) Inletting of material;
(2) Processing by the first multifunction work machine 103;
(3) Processing by the second multifunction work machine 104;
(4) Processing by the third multifunction work machine 105;
(5) Intermediate cleaning and vacuum drying in the cleaning machine 108;
(6) Leaking test by the multifunction work machine 107;
(7) Attaching and fastening a cap by the multifunction work machine 107;
(8) Furnishing by the multifunction work machine 106;
(9) Honing by the multifunction work machine 106;
(10) Inspecting by the multifunction work machine 106;
(11) Final cleaning and vacuum drying in the cleaning machine 108;
(12) Assembling a press fitting plug by the multifunction assembling machine 107;
(13) Leaking test by the multifunction assembling machine 107; and
(14) Conveying a furnished product Hereinafter, each process as described above is described in detail.

(1) Inletting of Material

At first, a workpiece 124 as a material is conveyed by the material lane 110. In the example, the workpiece 124 is a cylinder block. When the workpiece is approached to an inlet side end (beside the first conveying robot 185), the workpiece 124 is gripped by the first conveying robot 185 and put on the workpiece receiving base 182a of the first carrier 182. At that time, the first carrier 182 is conveyed to a location beside the first conveying robot 185 along the first rail 181. When the workpiece 124 is put on the workpiece receiving base 182a of the first carrier 182, the first carrier 182 is carried to a location beside the second conveying robot 186 along the first rail 181 by the second conveying robot 186. As described above, a movement of the fist carrier 183 conveyed by the second conveying robot 186 is operated by hooking and pulling the arm portion 182b of the first carrier 182 with the gripper 188 of the first conveying robot 185.

(2) Processing by the First Multifunction Work Machine 103

The workpiece 124 on the workpiece receiving base 182a of the first carrier 182 conveyed to a location beside the second conveying robot 186 is gripped by the gripper 188 of the second conveying robot 186 so as to set the workpiece 124 on the workpiece mounting base 129 of the first multifunction work machine 103 (see FIG. 2A and FIG. 2B). The second conveying robot 186 has seven axes so that the workpiece 124 can be smoothly set on the workpiece mounting base 129 of the first multifunction work machine 103. As shown in FIG. 2A and FIG. 2B, The both end surfaces 124a and 124b of the workpiece 124 are processed.

(3) Processing by the Second Multifunction Work Machine 104

After finishing an operation by the first multifunction work machine 103, the workpiece 124 is picked up from the workpiece mounting base 129 of the first multifunction work machine 103 by the first conveying robot 185. Then, the workpiece 124 is set on the workpiece mounting base 131 of the second multifunction work machine 104 located adjacent to the first multifunction work machine 103 by the first conveying robot 185 (see FIG. 2C and FIG. 2D). As shown in FIG. 2C and FIG. 2D, an arrangement of the workpiece 124 on the workpiece mounting base 131 is different from that on the workpiece mounting base 129. As shown in FIG. 2C and FIG. 2D, an upper surface 124c and a lower surface 124c of the workpiece 124d are processed.

(4) Processing by the Third Multifunction Work Machine 105

After finishing an operation of the second multifunction work machine 104, the workpiece 124 is gripped by the gripper 188 of the second conveying robot 186 and put on the workpiece receiving base 184a of the second carrier 184 waited at the location beside the second conveying robot 186 on the second rail 183. When workpiece 124 is put on the workpiece receiving base 184a, the arm portion 184a of the second carriers 184b is engaged by the gripper 188 of the second conveying robot 186. Then the second carrier 184 is moved along the second rail 183 pushed by the second carrier robot 186. The second carrier 184 is moved as far as possible in accordance with an elongated distance of the second robot 186. As shown in FIG. 9, in the next, the third conveying robot 187 is extended so that a finger 188a of the gripper 188 hooks the arm portion 184c of the second carrier 184. The third conveying robot 186 is folded up so that the second carrier 184 is moved to an edge portion of the third conveying robot 187 on the second rail 183. A stroke of the second conveying robot 186 and the third conveying robot 187 is restricted. Even if a distance for moving the workpiece 124 is over the stroke, the workpiece 124 can be conveyed along a distance longer than the stroke of the robots 186 and 187 by utilizing the carriers 182 and 184 pushed/pulled by the robots 186 and 187.

The workpiece 124 put on the workpiece receiving base 184a of the second carrier 184 conveyed to the end portion of the third conveying robot 187 on the second rail 183 is gripped by the gripper 188 of the third conveying robot 187 (see FIG. 10), the workpiece is conveyed and mounted on the work mounting base 133 of the third multifunction work machine 105 by rotating the third conveying robot 187 while the workpiece 124 is held in the same style. As shown in FIG. 2E and FIG. 2F, a plurality of convex portions 124e are formed on the workpiece 124 by the third multifunction work machine 105.

(5) Intermediate Cleaning and Vacuum Drying in the Cleaning Machine 108

The workpiece 124 processed by the third multifunction work machine 105 is conveyed to the cleaning machine 108 so as to clean the workpiece 124. As shown in FIG. 8, the conveying inlet/outlet opening portion 162 of the cleaning machine 108 is located within a movable area D of the third conveying robot 187. Therefore, a movement of the workpiece from the third multifunction work machine 105 to the cleaning machine 108 is operated by gripping the workpiece 124 on the workpiece mounting base 133 of the third multifunction work machine 105 with the gripper 188 of the third conveying robot 187, rotating the third conveying robot 187 so as to pass the workpiece 124 directly to the conveying inlet/outlet opening portion 162. The workpiece 124 is put on the workpiece receiving base 165 waiting at the conveying inlet/outlet station 166 located inside of the conveying inlet/outlet opening portion 162. In the next, a rotational movement of the leg portions 166 is operated by index rotating the workpiece supporting machine 163 so that the workpiece receiving base 165 is conveyed to the first intermediate cleaning station 167. As the first intermediate cleaning station 167, the workpiece 124 is cleaned with cleaning liquid jetted from the intermediate cleaning nozzles 170 and 171. After cleaning the workpiece 124, water chopping is operated by vacuum blowing. In the intermediate cleaning operation, the first intermediate cleaning station 167 and the second intermediate cleaning station 168 are selectively utilized.

(6) Leaking Test by the Multifunction Work Machine 107

After intermediate cleaning the workpiece 124 by the cleaning machine 108, a leaking test is operated in the multifunction assembling machine 107. In the case that the workpiece 124 is conveyed from the cleaning machine 108 to the multifunction assembling machine 107, the workpiece 214 returned to the conveying inlet/outlet station 163 of the cleaning machine 108 is gripped by the third conveying robot 187 at first. Then, the workpiece 124 is put on the workpiece receiving base 184a of the second carrier 184 waited at allocation beside the third conveying robot 187 on the second rail 183. In the next, the gripper 188 of the third conveying robot 187 hooks on the arm portion 184c of the second carrier 184. By extending the third conveying robot 187, the second carrier 184 is moved along the second rail 183. The second carrier 184 is conveyed toward the second conveying robot 186 as far as possible in accordance with an maximum extension of the third conveying robot 187. In the next, the gripper 188 of the second conveying robot 186 hooks at the arm portion 184b of the second carrier 184. And then the second carrier 184 is moved along the second rail 183 by contracting the second conveying robot 186 until the workpiece receiving base 184a is moved to a location near the second conveying robot 186.

The workpiece 214 on the workpiece receiving base 184a of the second carrier 184 is gripped by the second conveying robot 186. By rotating the second conveying robot 186, the workpiece 124 is put on the workpiece mounting base 143 through the conveying inlet/outlet opening portion 142. The workpiece 124 is moved to a position beyond the operation head 144 by the workpiece conveying robot 152 so as to operate the leaking test with the operation head 144 and the intermediate leaking tool 147.

(7) Attaching and Fastening a Cap by the Multifunction Work Machine 107

As shown in FIG. 3, the part tray 128 on which the bearing cap 126, the forced insertion plugs 127 and so on are arranged is supplied from the part supplying shelf 122 to the part tray setting space 150. The part tray 128 is conveyed on the workpiece receiving base 182a of the first carrier 182 by the first conveying robot 185. The part tray 128 is conveyed from the workpiece receiving base 182 to the workpiece mounting base 143 of the multifunction assembling machine 107 through the conveying inlet/outlet opening portion 142 by the second conveying robot 186. Then, the part tray 128 is conveyed to the part tray setting space 150 by the part conveying robot 151.

On the workpiece 124, the bearing cap 126 is attached by fastening with the bolt 125 by the operation head 144 and the cap fastening tool 148.

(8) Furnishing by the Multifunction Work Machine 106

After assembling the bearing cap 126 by the multifunction assembling machine 107, the workpiece 124 is conveyed to the multifunction furnishing machine 106 for furnishing the workpiece 124. At first, the workpiece 124 is conveyed to a location near the conveying inlet/outlet opening portion 142 of the workpiece mounting base 142 beyond the working head 144 by the workpiece conveying robot 152. In the next, the gripper 188 provided at the front end of the second conveying robot 186 is inserted into the multifunction assembling machine 107 through the conveying inlet/outlet opening portion 142 so as to grip the workpiece 124 and pull out from the multifunction assembling machine 107. On the other hand, the second carrier 184 is waited on the second rail 183 at a side near the second conveying robot 186. The workpiece 124 picked up by the second conveying robot 186 is put on the workpiece receiving base 184a of the second carrier 184. The gripper 188 of the second conveying robot 186 hooks at the arm portion 184b of the second carrier 184 and the second carrier 184 on the second rail 183 is pushed toward the third conveying robot 187. After moving the second carrier 184 along a predetermined distance by pushing the second conveying robot 186, the third conveying robot 187 is extended and the gripper 188 of the third conveying robot 187 hooks at the arm portion 84c of the second carrier 184c. As shown in FIG. 10, the third robot 187 is folded so that the second carrier 184 is conveyed toward a portion near the third conveying robot 187 along the second rail 183.

The workpiece 124 on the workpiece receiving base 184c of the second carrier 184 is gripped by the gripper 188 of the third conveying robot 187. By operating the third conveying robot 187, the workpiece 124 is conveyed to the workpiece mounting base 135 of the multifunction furnishing machine 106. As shown in FIG. 2G and FIG. 2H, the workpiece 124 is set at the mounting tool 136 of the workpiece amounting base 135 and fixed by the mounting tool 137. FIG. 8 shows the workpiece 124 set at the multifunction furnishing machine 106 by the third conveying robot 187.

As shown in FIG. 2G and FIG. 2H, an upper surface and an lower surface of the workpiece 24 are furnished by the multifunction furnishing machine 106.

(9) Honing by the Multifunction Work Machine 106

In the next, it is described a drilling and honing process operation by the multifunction furnishing machine 106.

At first, the draw-bar driving shaft 23 is rotated by the draw-bar driving motor 28 in the main shaft device 1 of the multifunction furnishing machine 106. The tool side draw-bar 32 is conveyed to an intermediate furnishing position (as shown in FIG. 18 to FIG. 20) through the main shaft side draw-bar 14 (hereinafter, it is referred as "the intermediate furnishing arrangement").

At the intermediate furnishing arrangement, a width of the intermediate furnishing taper surface 32b and the furnishing taper surface 32 in a radial direction at position confronting with the taper transmission pin 39 as shown in FIG. 18 and FIG. 20 is wider than those as shown in FIG. 14 to FIG. 16. Therefore, the taper transmission pin 39 for contacting with the intermediate furnishing taper surface 32b and the furnishing taper surface 32c is slit toward an outer radial direction in the holding member 40 so that the intermediate furnishing cutting tool holding member 35a and a position corresponding the intermediate furnish cutting tool 35b and the furnishing cutting tool 36b of the furnishing cutting tool holding member 36a are pressed.

As described above, a base end of the intermediate furnishing cutting tool holding member 35a, that is, an offset position of the intermediate furnishing cutting tool holding member 35a with respect to a width in the axial direction is fixed on the tool body 31 with a screw and the notch 35c is provided at a surface 41f confronting with the tool side draw-bar 32. Thereby, when the surface 41f is pressed by the taper transmission pin 39, a part of the surface 41f at a side from the notch portion 35c to the intermediate furnishing cutting tool 35b is elastically deformed so that the intermediate furnishing cutting tool 35b is shifted toward an outer radial direction.

Likewise, a base end of the furnishing cutting tool holding member 36a, that is, an offset position of the furnishing cutting tool holding member 36a with respect to a width in the axial direction is fixed on the tool body 31 with a screw and the notch 36c is provided at a surface 42f confronting with the tool side draw-bar 32. Thereby, when the surface 42f is pressed by the transmission pin 39, a part of the surface 42f at a side from the notch portion 36c to the furnishing cutting tool 36b is elastically deformed so that the furnishing cutting tool 36b is shifted toward an outer radial direction.

At that time, inclined angle of the intermediate furnishing taper surface 32b is different from that of the furnishing taper surface 32c. A width of the intermediate furnishing taper surface 32b at a portion confronting with the taper transmission pin 39 in a radial direction is wider than a width of the furnishing taper surface at a portion confronting with the taper transmission pin 39 in the radial direction. Thereby, at the intermediate processing arrangement, the intermediate furnishing cutting tool 35b is protruded larger than the furnishing cutting tool 36b in the outer radial direction.

Further, upon comparing with a condition as shown in FIG. 19 and FIG. 20 and a condition as shown in FIG. 15, the honing member 37 as shown in FIG. 19 and FIG. 20 is shifted toward the whetstone extending plate 41, that is, shifted toward an inner radial direction. At least, a surface of the whetstone 37b is located at a position inner side of the outer diameter of the intermediate cutting tool 35b in a radial direction, In the intermediate furnishing arrangement, the tool side draw-bar 32 is moved in order that the outer diameter of the intermediate furnishing cutting tool 36b is relatively larger than that of the furnishing cutting tool 36b and the whetstone 37b. For example, the outer diameter of the intermediate furnishing cutting tool 35b is 0.1 mm less than a required outer diameter of the furnishing cutting tool.

As described above, the tool side draw-bar 32 is moved to the intermediate furnishing arrangement, the main shaft 13 is rotated by the main shaft driving motor 19 so as to intermediate furnish the workpiece with the intermediate furnishing cutting tool 35b.

After intermediate furnishing, while a rotation of the main shaft 13 is maintained, the draw-bar driving shaft 23 is rotated by the draw-bar driving motor 28. Thus, the tool side draw-bar 32 is backwardly moved to a furnishing processing position (hereinafter, it is referred as "furnishing process arrangement") as shown in FIG. 21 to FIG. 23 via the main shaft side draw-bar 14.

In the case that the tool side draw-bar 32 is moved from the intermediate furnishing arrangement to the furnishing arrangement, the tool side draw-bar 32 is pressurized toward the main shaft side by the hydraulic spring 43 and the diaphragm brake 44 so that the tool side draw-bar 32 connected to the main shaft side draw-bar 32 via the collet 30 can be certainly followed.

At the furnishing arrangement, a width of the furnishing taper surface 32b and the furnishing taper surface 32 in a radial direction at position confronting with the taper transmission pin 39 as shown in FIG. 21 and FIG. 23 is wider than those as shown in FIG. 18 to FIG. 20. Accordingly, the taper transmission pin 30 contacting with the intermediate furnishing taper surface 32b and the furnishing taper surface 32c is slit toward an outer radial direction in the holding member 40 so as to press the intermediate furnishing holding member 35a, a portion of the furnishing cutting tool holding member 36a corresponding to the intermediate furnishing cutting tool 35b and the furnishing cutting tool 36b further.

Thereby, an elastic deformation at a side from the notch portion 35c to the intermediate furnishing cutting tool 35b is relatively larger in the intermediate furnishing cutting tool 35b. The intermediate furnishing cutting tool 35b is moved toward an outer radial direction. Likewise, an elastic deformation at a side from the notch portion 36c to the furnishing cutting tool 36b is relatively larger in the furnishing cutting tool 36b. The furnishing cutting tool 366b is moved toward an outer radial direction.

At that time, an inclined angle of the intermediate furnishing taper surface 32b and an inclined angle of the furnishing taper surface 32c is different each other. Upon comparing the furnishing arrangement and the intermediate furnishing arrangement as shown in FIG. 18 and FIG. 19, a width of the intermediate furnishing taper surface 32b at a portion confronting with the taper transmission pin 39 in a radial direction is narrower than a width of the furnishing taper surface 32c at a portion confronting with the taper transmission pin 39 in the radial direction. Therefore, in the furnishing arrangement, the furnishing cutting tool 36b is protruded more than the intermediate furnishing cutting tool 35b toward the outer radial direction.

A position of the honing member 37 as shown in FIG. 22 is offset to the whetstone extending plate 41 (toward an inward radial direction) comparing with that as shown in FIG. 20. A surface of the whetstone 37b can be maintained at a position where is inside of the outer diameter of the furnishing cutting tool 36b.

As described above, in the furnishing arrangement, the tool side draw-bar 32 is moved in order that an outer diameter of the furnishing cutting tool 36b is larger than that of the intermediate furnishing cutting tool 35b and an outer diameter of the whetstone 37b. For example, a diameter of the furnishing cutting tool 36b is set as a furnished diameter.

After furnishing, the draw-bar driving shaft 23 is rotated by the draw-bar driving motor 28 so as to move the tool side draw-bar 32 forwardly (for example, move to the intermediate furnishing arrangement) via the main shaft side draw-bar 14. Thereby, a width of the intermediate furnishing taper surface 32b at a portion confronting with the taper transmission pin 39 and a width of the furnishing taper surface 32c at a portion confronting with the taper transmission pin 39 becomes narrower in a radial direction. In the case that the taper transmission pin 39 is slit toward an inner radial direction in the holding member 40, a deformed portion of the intermediate furnishing cutting tool 35a and that of the furnishing cutting tool 36a are moved toward the axial line by their recovery force. Upon comparing with the condition and a condition as shown in FIG. 21 to FIG. 23, the intermediate furnishing cutting tool 35b and the furnishing cutting tool 36b in the condition are moved toward an inner radial direction.

(10) Inspecting by the Multifunction Work Machine 106

After stopping the rotational movement of the main shaft 13 by intermitting the main shaft driving motor 19, a diameter of a hole formed in the workpiece 124 is measured by an air micrometer.

It is described how a diameter of the hole is measured by the air micrometer. In the case that a diameter of a hole is measured by the air micrometer, the NC device 3 as shown in FIG. 13 outputs a measurement command to the sequencer 29c. When the measurement command is output from the sequencer 29c to the control device 29b, an A/D converter 29a, a measurement air supplying source 29d and an air supply connecting unit 20 are begun to control in accordance with the measurement command input to the control device 29b. When the air supply connecting unit 20 is moved toward the tool 2 by hydraulic pressure, the measurement air supplied from the measurement air supplying source 29d through the A/D converter 29a is jetted from a respective measurement air nozzles 33 through the measurement air supplying path 13b and the measurement air supplying path 31d.

At that time, the A/D converter 29a detect a pressure value of the measurement air (corresponding to flowing amount of the measurement air) and output a pressure detecting signal to the control device 29b. In the control device 29b, a flowing amount of the measurement air is detected in accordance with the pressure detecting signal output from the A/D converter 29a. Judging from the flowing amount of the measurement air and previous stored data showing a relation between a flowing amount of a measurement air and a diameter of a hole, a diameter of a hole formed in a workpiece is detected.

After finishing the measurement by the air micrometer, the draw-bar driving shaft 23 is rotated by the main shaft driving motor 19 in accordance with the result of the measurement, the main shaft side draw-bar 14 is advanced to a honing position (a position as shown in FIG. 14 to FIG. 16) via the main shaft side draw-bar 14 (hereinafter, it is referred as "honing arrangement").

In the honing arrangement as shown in FIG. 14 to FIG. 16, a width of the intermediate furnishing taper surface 32b at a portion confronting with the taper transmission pin 39 and a width of the furnishing taper surface 32c at a portion confronting with the taper transmission pin 39 in a radial direction becomes narrower than those as shown in FIG. 10 to FIG. 20. Therefore, the taper transmission pin 30 contacting with the intermediate furnishing taper surface 32b and the furnishing taper surface 32c is further slid toward an inner radial direction in the holding member 40 and the taper transmission pin 39 is stored in the tool body 31.

Thereby, the intermediate furnishing cutting tool holding member 35 and the cutting tool holding member 36a elastically deformed are recovered to an original style. With respect to the intermediate furnishing arrangement and the furnishing arrangement, the intermediate furnishing cutting tool 35b and the furnishing cutting tool 36b are shifted toward the inner radial direction.

On the contrary, the honing member 37 is moved toward an outer radial direction along the inclined portions 41a and 41b of the whetstone extending plate 41 and then the honing member 37 is outwardly moved to the radial direction. Thus, an outer diameter of the whetstone 37b is protruded toward the outer radial direction comparing with the outer diameter of the intermediate furnishing cutting tool 35b and the furnishing cutting tool 36b.

As described above, in the honing arrangement, the tool side draw-bar 32 is moved in order that the outer diameter of the whetstone 37b is larger than that of the intermediate furnishing cutting tool 35b and the furnishing cutting tool 36b. For example, the diameter of the whetstone 37b is set a furnished diameter with a tolerance of ±20 μm.

Further, in the embodiment, a diameter of a hole formed in a workpiece 124 is always detected by the air micrometer in the honing operation. Depending on a detected condition, a position of the tool side draw-bar 32 is adjusted by the draw-bar driving motor 28 until a diameter of a hole formed in the workpiece 124 becomes a required size in the honing operation.

After the air micrometer recognizing that the diameter of the hole formed in the workpiece is the required size, a position of the tool side draw-bar 32 is backwardly moved to the intermediate furnishing arrangement as shown in FIG. 18 to FIG. 20 by the draw-bar driving motor 28.

In the case that the main shaft side draw-bar 14 is backwardly moved from the honing arrangement, the whetstone extending plate 41 is moved toward the main shaft with respect to the honing member 37. The honing member 37 and the whetstone extending plate 41 are connected with the whetstone interlocking pin 42. In the case that the honing member 37 is moved as described above, the whetstone interlocking pin 42 is inserted into the hole 37e. Then the honing member 37 is pulled toward an inter radial direction so that the honing member 37 can be moved toward the inner radial direction.

When the diameter of the whetstone 37b becomes smaller, the main shaft driving motor 19 is stopped and then a rotational movement of the main shaft driving motor 19 is stopped. A work operation of the multifunction furnishing machine 106 is finished.

As described above, in accordance with the multifunction furnishing machine 106 according to the embodiment, a series of working process from a bowling process by cutting tools to a honing process with whetstones can be only operated by one machine so that an operation efficiency is improved and manufacturing cost relating to process can be reduced.

(11) Final Cleaning and Vacuum Drying in the Cleaning Machine 108

After finishing the working and detecting operation by the multifunction furnishing machine 106, the workpiece 124 is picked up from the third conveying robot 187 and conveyed to the cleaning machine 108 from the conveying inlet and outlet opening portion 162. In the cleaning machine 108, the workpiece 124 is put on the workpiece receiving base 165 waited at the conveying inlet and outlet station 166 inside the conveying inlet and outlet opening portion 162. The leg portion 164 is rotated by an indexing rotation of the workpiece supporting device 163 so that the workpiece receiving base 165 is conveyed to the furnishing cleaning station 169. In the furnishing cleaning station 169, the workpiece 124 is cleaned with cleaning liquid jetted from the furnishing cleaning nozzles 172. The cleaning robot 173 can jet cleaning liquid toward a target on the workpiece 124 so that burr occurred in the working operation can be moved. After cleaning, cleaning liquid wetted on the workpiece 124 is removed by vacuum blowing and the workpiece 124 is dried. The workpiece 124 cleaned and dried up is moved to the conveying inlet and outlet station 166 in the cleaning machine 108 by the indexing rotation of the workpiece receiving base 165 of the workpiece supporting machine 163.

(12) Assembling a Press Fitting Plug by the Multifunction Assembling Machine 107

The workpiece 124 on the workpiece receiving base 125 located at the conveying inlet and outlet station 166 in the cleaning machine 108 is gripped by the third conveying robot 187. The workpiece 124 is moved a location outside of the cleaning machine 108 and put on the workpiece receiving base 184a of the second carrier 184 waited at a location beside the third conveying robot 187. Then, the second carrier 184 is moved to a location beside the second conveying robot 186 on the second rail 183 by the third conveying robot 187 and the second conveying robot 186. The workpiece 124 on the workpiece receiving base 184a of the second carrier 184 moved to a position near the second conveying robot 186 is gripped by the second conveying robot 186 and then the workpiece 124 is put on the workpiece mounting base 143 in the room 141 through the conveying inlet and outlet opening portion 142 of the multifunction assembling machine 107. Then, the workpiece 124 is moved to a location beyond the working head 144 by the workpiece conveying robot 152. A plug forced insertion 127 is assembled at a predetermined position of the workpiece 124 by the plug press fitting tool 146 and so on. As described above, plugs forced insertion 124 are previously supplied to the part tray space 150 by the part tray 128.

(13) Leaking Test by the Multifunction Assembling Machine 107

In the leaking test, the furnishing leaking tool 149 detects whether the workpiece 124 assembled with the plug forced insertion 127 is leaked or not.

(14) Conveying a Furnished Product

After finishing the leaking test in the multifunction assembling machine 107, the workpiece 124 is conveyed as a furnished product. In the case that the workpiece 124 as the furnished product is conveyed, the workpiece 124 already detected in the leaking test is conveyed to a location near the conveying inlet and outlet opening portion 142 of the work mounting base 143 by the workpiece conveying robot 152. The gripper 188 of the second conveying robot 186 grips the workpiece 124 through the conveying inlet and outlet opening portion 142. The gripped workpiece 124 is put on the workpiece receiving base 182a of the first carrier 182 located at a position near the second conveying robot 186. The first carrier 182 is pushed by the second conveying robot 186 and then pulled on the first rail 181 toward the first conveying robot 185 by the first conveying robot 185. Then, the workpiece 124 on the workpiece receiving base 182a of the first carrier 182 is gripped by the first conveying robot 185 and conveyed to the furnished product lane 111. The workpiece 124 is conveyed on the furnished product lane 111.

As described above, in the work line module 101 of the embodiment 1, the multifunction furnishing machine 106 comprises not only a machining function but also a detecting function. Further, by employing a new conveying machine 109 including robots 185, 186 and 187 and carriers 182 and 184, it is accomplished to provide a compact facility wherein a workpiece 124 is inserted, processed, detected and assembled in series. By combining the work line module 101, the facility can easily manufacture products even if a requested amount of the products is varied.

Embodiment 2

Figure 24:
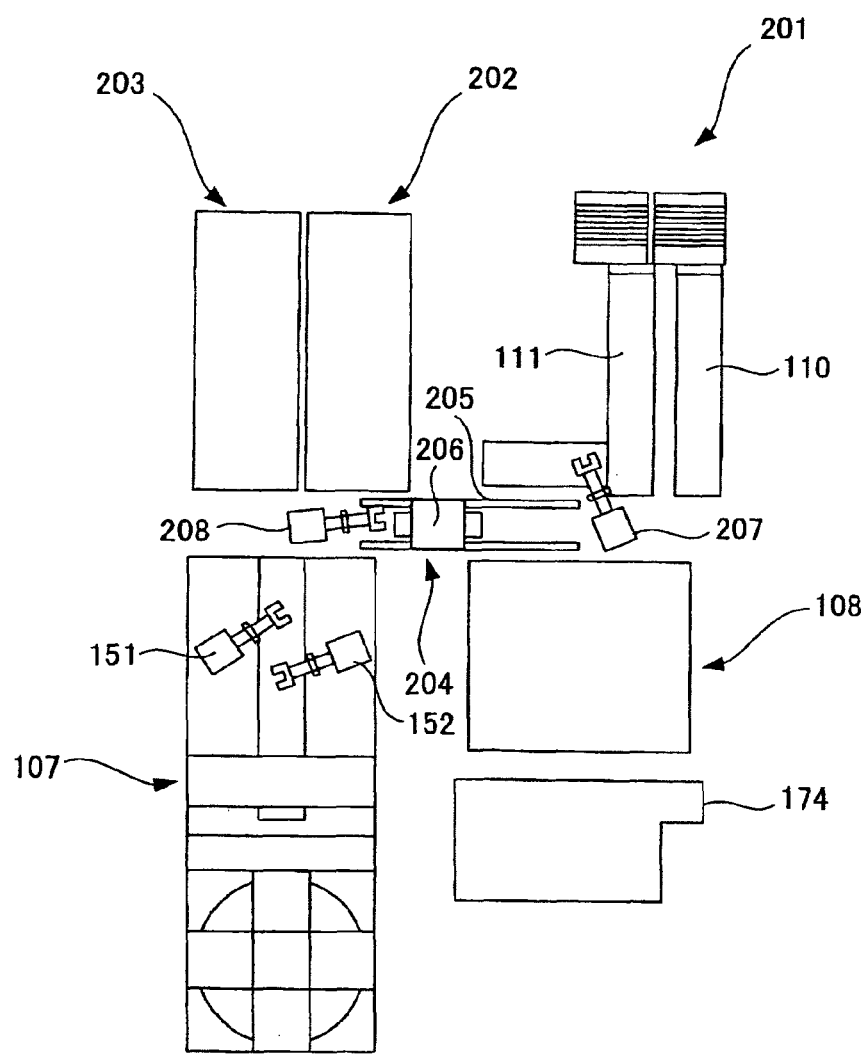
FIG. 24 is a plan view for showing an outline of a work line module according to an embodiment 2.

FIG. 24 shows the second embodiment of an outline of a work line module according to the present invention.

The work line module 201 comprises an automatic pallet change (APC) machine as a work machine so that the total number of the work machines can be reduced. The work line module 201 comprises the first multifunction work machine 202 and the second multifunction work machine 203 as a multifunction furnishing machine. The work line module 201 further comprises a part stocking and supplying portion 102, a multifunction assembling machine 107, a cleaning machine 108 those are substantially same to those in the embodiment as shown in FIG. 1, although a layout of those machines in FIG. 24 are different from those in FIG. 1. Since the total number of the work machines is reduced, a conveying device 204 for conveying a workpiece is different from the workpiece conveying device 109 in the work line module 101 as shown in FIG. 1. The conveying device 204 is formed by one rail, one carrier trucked on the rail and two conveying robots 207 and 208 located at the both ends of the lane 205.

In the embodiment 2 of the work line module 201, the automatic pallet change machine can automatically change jigs, the automatic tool change device adapted to the work machine can automatically change tools and robots having seven axes are provided so as to manufacture products smoothly and flexibly.

Although the embodiments 1 and 2 described a work machine as a multifunction work machine, it may be a combination of a special purpose machine and a multifunction assembling machine. Although a cleaning machine and a multifunction assembling machine are described as a non-working facility, it may provide one of then in accordance with a request. It is important that a series of the whole operation, that is, a working operation such as cutting and drilling, a non-working operation such as assembling and a conveying operation are accomplished in one line module by combining work machines, non-work machines and conveying machines.

Embodiment 3

Figure 25:
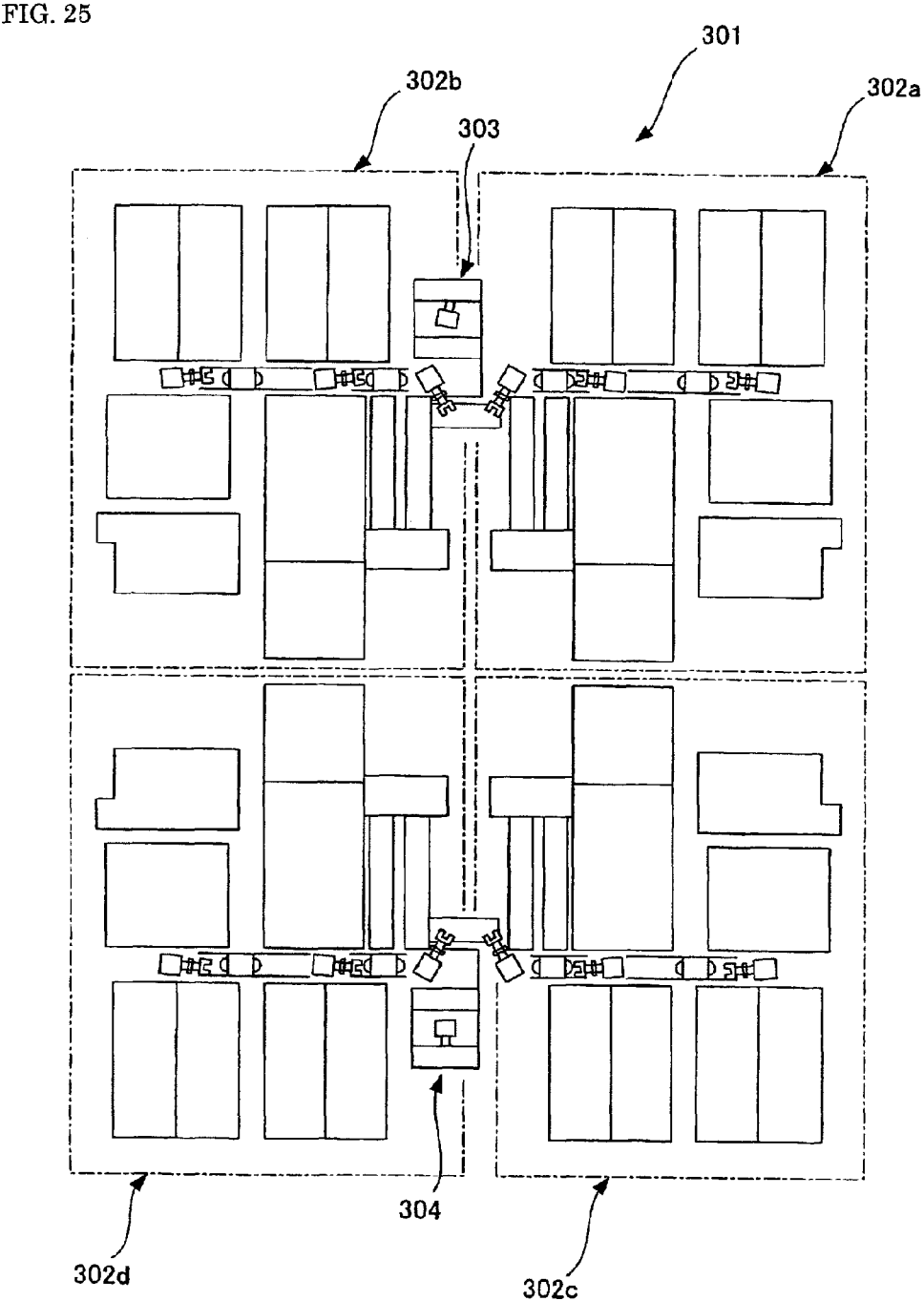
FIG. 25 is a plan view for showing an outline of a work facility according to an embodiment 3.

FIG. 25 is a plan view for showing an outline of an embodiment 3 of a work facility.

The work facility 301 comprises a combination of the work line module 101 as shown in FIG. 1 and similar four work line modules 302a, 302b, 303c and 302d. Part stocking and supplying portions 303 and 304 can be commonly utilized for the adjacent work line modules 302a and 302b and the adjacent work line modules 302c and 302d, respectively. A structure of the part stocking and supplying portions 303 and 304 are as same as the structure of the part stocking and supplying portion 102 as shown in FIG. 1.

In the embodiment 3, a work machine having a necessary function for a series of operation and a work line module 101 including a combination the work machine and so on are added. Thus, the embodiment 3 can be corresponding to a product amount, even if the product amount is increased depending on a demand. In each work line modules 302a-302d, a series of operations from beginning to finishing can be processed. An adjustment of the product amount can be easily controlled. Even if one of the work line modules has any trouble, the manufacturing line is not completely stopped.

The invention claimed is:

1. Work line module, comprising:
  a combination of a plurality of work machines for mechanically working a workpiece, non-working facility for not mechanically working the workpiece, wherein
  at least one work machine in the plurality of work machines is a multifunction work machine mechanically working the workpiece and measuring the workpiece, and a conveying machine including a robot for conveying the workpiece among the work machines and the non-work facility and the workpiece are continuously operated in a series of operations with respect to the workpiece in the work line module,
  wherein the conveying machine comprises a rail provided along the work machines, the non-work facility; and a carrier on which the workpiece is mounted and a robot having seven axes,
  wherein the robot is arranged at a location between the work machines and a non-work facility and moved along the rail, and the workpiece is conveyed between the carrier and the work machines or a non-work facility, the work machines and between the work machine and the non-work facility,
  the conveying robots have no moving function for moving over a floor,
  the conveying machine has a gripper for gripping and releasing the workpiece by opening and closing fingers, and
  an arm portion for being gripped and released by the gripper provided at a carrier,
  wherein in the case that the gripper of the robot cannot directly grip the workpiece on a carrier, the gripper of the conveying robot grips the arm portion provided at the carrier trucked on a rail and conveys the carrier so as to move the workpiece to a location where a conveying robot having a moving function can directly grip the workpiece on the carrier.

2. The work line module as claimed in claim 1, wherein the multifunction work machine has a function of furnishing and a function of measuring.

3. A Work Facility comprising:
a plurality of work line modules, wherein
each work line module is claimed in claim 2.

4. Work line module as claimed in claim 1, wherein the non-work facility includes at least one of an assembling device for assembling a workpiece and a cleaning device for cleaning the workpiece.

5. A Work Facility, comprising:
a plurality of work line modules, wherein
each work line module is claimed in claim 4.

6. A Work Facility, comprising:
a plurality of work line modules, wherein
each work line module is claimed in claim 1.

7. A Work Facility, comprising:
a plurality of work line modules, wherein
each work line module is claimed in claim 1.

* * * * *